United States Patent
Suzuki

(10) Patent No.: US 9,810,816 B2
(45) Date of Patent: Nov. 7, 2017

(54) ROD LENS ARRAY UNIT, PRODUCTION METHOD OF ROD LENS ARRAY UNIT, LED PRINT HEAD, IMAGE SENSOR HEAD, IMAGE FORMING APPARATUS, AND IMAGE READER

(71) Applicant: Oki Data Corporation, Tokyo (JP)

(72) Inventor: Takahito Suzuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/048,327

(22) Filed: Feb. 19, 2016

(65) Prior Publication Data
US 2016/0291215 A1 Oct. 6, 2016

(30) Foreign Application Priority Data
Mar. 31, 2015 (JP) .................. 2015-071984

(51) Int. Cl.
H04N 1/024 (2006.01)
H04N 1/04 (2006.01)
G02B 3/00 (2006.01)

(52) U.S. Cl.
CPC .......... *G02B 3/0075* (2013.01); *G02B 3/005* (2013.01); *G02B 3/0025* (2013.01); *H04N 1/02445* (2013.01); *H04N 2201/0081* (2013.01)

(58) Field of Classification Search
CPC .... G02B 3/0075; G02B 3/0025; G02B 3/005; H04N 1/02445; H04N 2201/0081
See application file for complete search history.

(56) References Cited

U.S. PATENT DOCUMENTS

| | | | | |
|---|---|---|---|---|
| 6,449,414 B1 * | 9/2002 | Tahara | ................... | G02B 3/005 359/652 |
| 9,091,957 B1 * | 7/2015 | Matsuo | ............... | G03G 15/0435 |
| 9,360,839 B2 * | 6/2016 | Imai | .................. | G03G 15/04054 |
| 2001/0040620 A1 * | 11/2001 | Wakisaka | ................. | B41J 2/451 347/263 |
| 2005/0056852 A1 * | 3/2005 | Suzuki | ....................... | B41J 2/45 257/93 |
| 2005/0087743 A1 * | 4/2005 | Ogihara | ..................... | B41J 2/45 257/72 |
| 2005/0161583 A1 * | 7/2005 | Matsumoto | .......... | G02B 3/0037 250/208.1 |
| 2009/0257128 A1 * | 10/2009 | Abe | ........................ | B41J 2/451 359/620 |
| 2012/0062686 A1 * | 3/2012 | Suto | ........................ | B41J 2/451 347/224 |
| 2013/0286146 A1 * | 10/2013 | Kitamura | ................. | G02B 1/04 347/224 |

(Continued)

FOREIGN PATENT DOCUMENTS

JP 2005-181949 A 7/2005

*Primary Examiner* — Cheukfan Lee
(74) *Attorney, Agent, or Firm* — Muncy, Geissler, Olds & Lowe, P.C.

(57) ABSTRACT

A rod lens array unit includes at least a rod lens array that includes a plurality of rod lenses arranged in a line, each of the rod lenses having an optical axis extending in an optical axis direction, and a pair of side plate parts stacked so as to sandwich the rod lens array. Wherein, end faces of the side plate parts in the optical axis direction of the rod lens array are positioned inside an end face of the rod lens array in the optical axis direction.

19 Claims, 27 Drawing Sheets

(56) References Cited

U.S. PATENT DOCUMENTS

| | | | | |
|---|---|---|---|---|
| 2015/0053844 A1* | 2/2015 | Kitamura | ............... | G02B 3/005 250/208.1 |
| 2015/0285961 A1* | 10/2015 | Koike | .................. | G02B 3/0075 359/619 |
| 2015/0346021 A1* | 12/2015 | Suzuki | ................... | H05K 1/181 347/258 |
| 2016/0152039 A1* | 6/2016 | Suzuki | ..................... | B41J 2/451 347/258 |
| 2016/0291215 A1* | 10/2016 | Suzuki | ................. | G02B 3/0075 |

* cited by examiner

Thick Direction

ROD LENS ARRAY UNIT, PRODUCTION METHOD OF ROD LENS ARRAY UNIT, LED PRINT HEAD, IMAGE SENSOR HEAD, IMAGE FORMING APPARATUS, AND IMAGE READER

CROSS REFERENCE TO RELATED APPLICATIONS

This application claims priority under 35 USC 119 to Japanese Patent Application No. 2015-071984 filed on Mar. 31, 2015, the entire contents which are incorporated herein by reference.

TECHNICAL FIELD

The present invention relates to a rod lens array unit including a rod lens array, a production method of the rod lens array unit, an LED print head including the rod lens array unit, an image sensor head including the rod lens array unit, an image forming apparatus including the LED print head, and an image reader including the image sensor head.

BACKGROUND

Generally, a rod lens array unit including a rod lens array in which a plurality of distributed index type rod lenses (hereinafter referred to as "rod lenses") are arranged along a predetermined direction is used as, for example, an LED print head used as an exposure device such as an LED (light Emitting Diode) printer, etc., and an image sensor head used as a reader such as an image scanner, etc. In a rod lens array unit, it is desired to reduce the variation in focal length of the rod lenses along the arrangement direction of the plurality of rod lenses included in the rod lens array. Further, it is desired that an excellent optical performance of the rod lens array unit is maintained by forming each of the end faces of the plurality of rod lenses as a mirror finished surface. Therefore, a method is proposed, in which, at the time of producing the rod lens array unit, a rod lens array is arranged between a pair of side plates that sandwiches and holds the rod lens array, and the edge part of the rod lens array and the side plates are cut to align the lengths of the plurality of rod lenses and finish the end faces of the rod lens array into mirror finished surfaces (for example, see Patent Document 1).

[Patent Document 1]
Japanese Unexamined Patent Application Publication No. 2005-181949

However, at the time of producing the rod lens array unit, for example, chips, etc., may remain at the edge parts of the side plates when cutting the edge parts of the rod lens array together with the side plates in a state in which the rod lens array is arranged between a pair of side plates. When the chips, etc., adhere to the end faces of the rod lens array, there was a problem that a stable optical performance could not be achieved.

The present invention aims to provide a rod lens array unit capable of achieving a stable optical performance, a production method of the rod lens array unit, an LED print head including the rod lens array unit, an image sensor head including the rod lens array unit, an image forming apparatus including the LED print head, and an image reader including the image sensor head.

SUMMARY

A rod lens array unit disclosed in the application includes at least a rod lens array that includes a plurality of rod lenses arranged in a line, each of the rod lenses having an optical axis extending in an optical axis direction, and a pair of side plate parts stacked so as to sandwich the rod lens array. Wherein, end faces of the side plate parts in the optical axis direction of the rod lens array are positioned inside an end face of the rod lens array in the optical axis direction. In the invention, the sandwiching by the side plate parts means that the side plate part may be in a physical-contact with the rod lens array, also may have one or more middle layers in a space created between the side plate part and the rod lens array. Putting other way, the side plate parts are directly or indirectly able to sandwiches the rod lens array.

An LED print head disclosed in the application includes a plurality of semiconductor light emitting element arrays, a board in which the semiconductor light emitting element arrays are arranged, the rod lens array unit discussed above, and a folder that holds the rod lens array unit and the board in a manner such that surfaces of the semiconductor light emitting element arrays are positioned at a focal position of the rod lens array provided in the rod lens array unit.

An image sensor head disclosed in the application includes a plurality of semiconductor light receiving element arrays, a board in which the semiconductor light receiving element arrays are arranged, the rod lens array unit discussed above; and a folder that holds the rod lens array unit and the board in a manner such that surfaces of the semiconductor light receiving element arrays are positioned at a focal position of the rod lens array provided in the rod lens array unit.

An image forming apparatus disclosed in the application includes the LED print heads discussed above.

An image reader disclosed in the application includes the image sensor head discussed above.

A method for producing a rod lens array unit disclosed in the application includes i) respectively fixing a first side face and a second side face of a rod lens array including a plurality of rod lenses to a first side plate and a second side plate with adhesive, ii) forming a first long notch that penetrates the first side plate, iii) forming a second long notch that penetrates the second side plate at a position corresponding to the first long notch; and, iv) cutting the rod lens array with a cutting width narrower than either a width of the first long notch or a width of the second long notch in the second long notch.

According to the rod lens array unit of the present invention, a stable optical performance can be achieved.

According to the LED print head of the present invention, a stable irradiation performance can be achieved.

According to the image sensor head of the present invention, a stable light receiving performance can be achieved.

According to the image forming apparatus of the present invention, a stable print quality can be achieved.

According to the image reader of the present invention, a stable image reading quality can be achieved.

According to the production method of the rod lens array unit of the present invention, a production method of a rod lens array unit capable of achieving a stable optical performance can be provided.

DETAILED DESCRIPTION OF EMBODIMENT(S)

Embodiment 1

<Structure of Rod Lens Array Unit 101>

Figure 1:
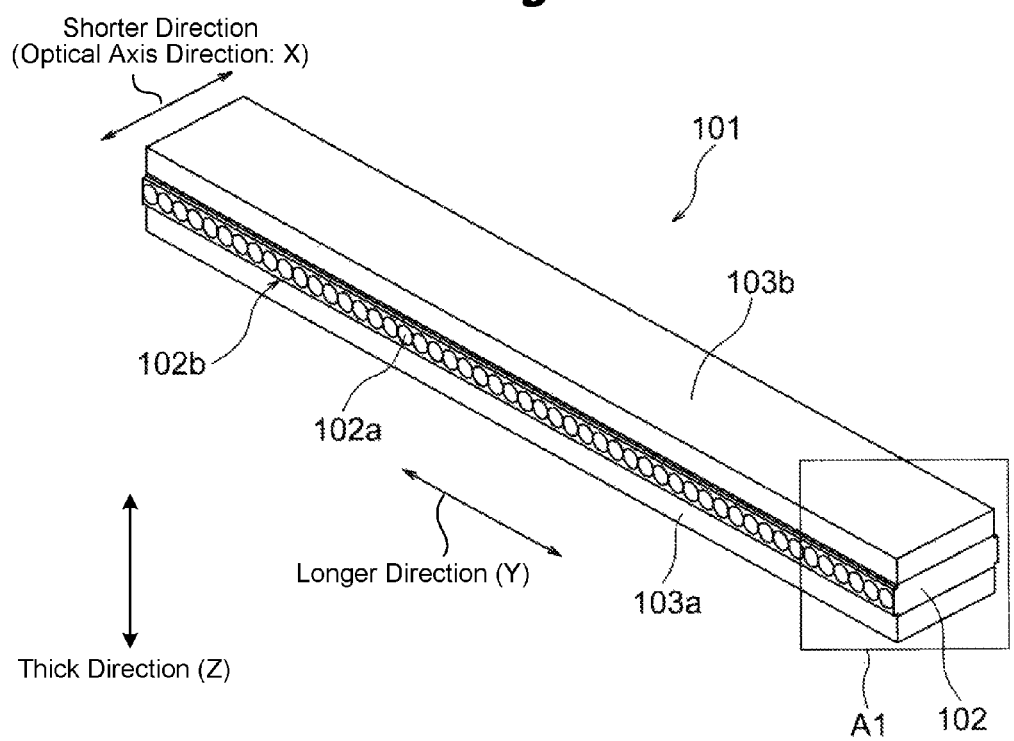
FIG. 1 is a perspective view showing a rod lens array unit according to Embodiment 1 of the present invention.
Figure 2:
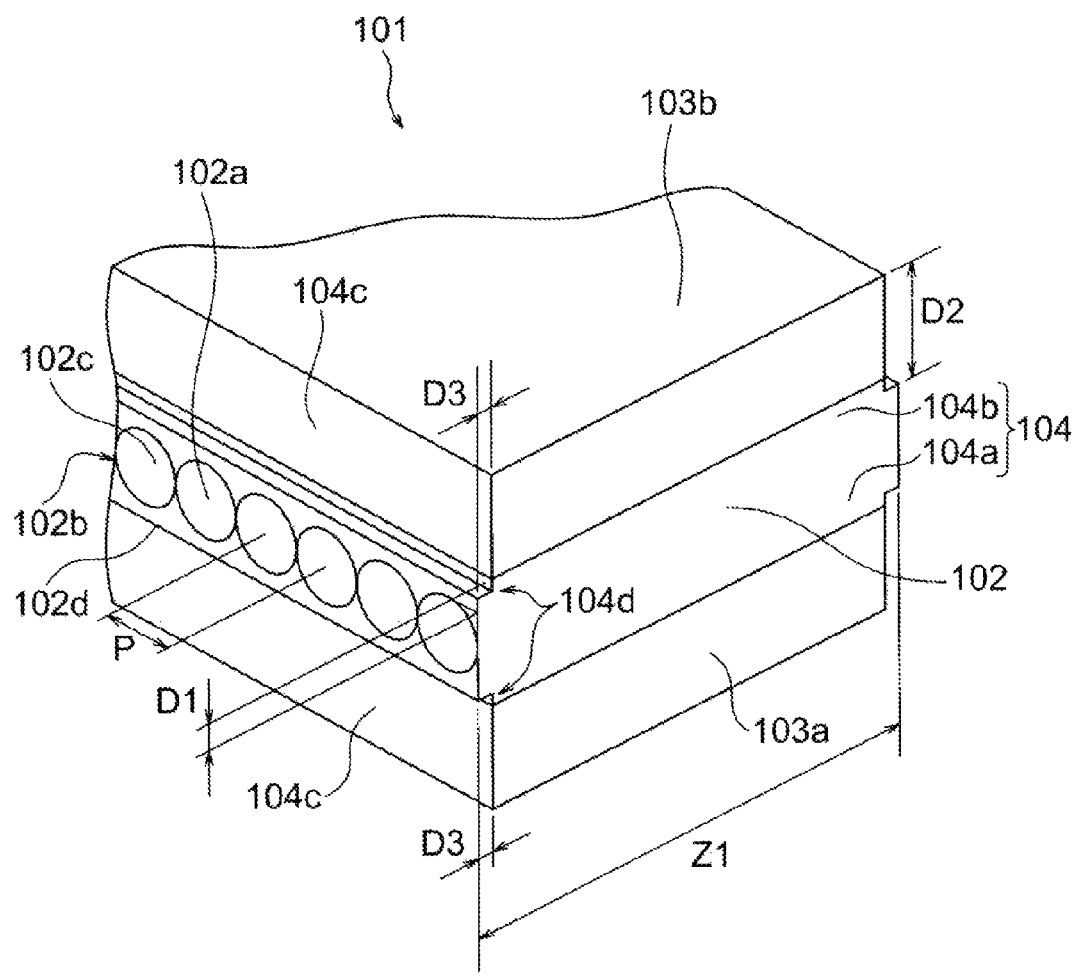
FIG. 2 is an enlarged perspective view showing a partial region of the rod lens array unit shown in FIG. 1.

FIG. 1 is a perspective view showing a rod lens array unit 101 according to Embodiment 1 of the present invention. FIG. 2 is an enlarged perspective view showing a partial region A1 of the rod lens array unit 101 shown in FIG. 1.

The rod lens array unit 101 as shown in FIG. 1 and FIG. 2 has a plane symmetry structure in which the plane passing through the optical axes of the plurality of rod lenses 102a is a symmetrical plane. In the rod lens array unit 101, the structures of both end sides of the rod lens array unit 101 in the shorter direction (optical axis direction) are the same. For this reason, only the structure of one end side will be explained and the explanation for the structure of the other end side will be omitted.

The rod lens array unit 101 includes a rod lens array 102b including a plurality of rod lenses 102a, and a first side plate 103a and a second side plate 103b as a pair of side plate parts stacked in a manner such that the rod lens array 102b is sandwiched. The end faces of the first side plate 103a and the second side plate 103b in the optical axis direction of the rod lens array 102b are positioned inside (inward of or within) the rod lens array 102b than the end faces of the rod lens array 102b in the optical axis direction of the rod lens array 102b.

The end face of the rod lens array 102b forms a first principal surface 102c and the end faces of the first side plate 103a and the second side plate 103b form second principal surfaces 104c. The first principal surface 102c and the second principal surfaces 104c are arranged on both sides of the rod lens array 102b in the optical axis direction. The second principal surfaces 104c are positioned inside the first principal surface 102c in the optical direction.

The rod lens array unit 101 has a stacked structure in which the rod lens array 102b is fixed with an adhesive (filling adhesive) so that a first distance D1, which is a distance between the side face of the rod lens array 102b and the first side plate 103a (second side plate 103b), is maintained between the first side plate 103a and the second side plate 103b.

The rod lens array unit 101 includes an adhesive part 102 arranged between the first side plate 103a and the second side plate 103b and fixing the rod lens array 102b and the first side plate 103a and the second side plate 103b.

The adhesive part 102 includes a filling adhesive layer 104 as a first adhesive layer. The filling adhesive layer 104 is a layer in which a filling adhesive as a first adhesive is filled in the space around the rod lens array 102b. The filling adhesive layer 104 includes a first filling adhesive layer 104a and a second filling adhesive layer 104b.

The rod lens array 102b and the adhesive part 102 form a protruded part 102d which protrudes outward in the optical axis direction of the rod lens array 102b than the second principal surface 104c. The protruded parts 102d are formed on both end sides in the shorter direction of the rod lens array unit 101, and include the region from the first principal surface 102c to the second principal surface 104c. The distance (face spacing) between the first principal surface 102c and the second principal surface 104c in the shorter direction is shown as a second distance D3.

As shown in FIG. 2, the first principal surface 102c is a surface including the end face of the rod lens array 102b at both end sides in the shorter direction (optical axis direction of the rod lens array 102b) of the rod lens array unit 101 and provided along the longer direction (Y) of the rod lens array unit 101.

The second principal surface 104c is a face provided along the longer direction of the rod lens array unit 101 on both end sides in the shorter direction of the rod lens array unit 101. Specifically, the second principal surface 104c is a surface including a portion of the end face of the rod lens array unit 101 in the shorter direction and the end face of the first side plate 103a in the shorter direction of the rod lens array unit 101. The second principal surface 104c is also a surface including a portion of the end face of the rod lens array unit 101 in the shorter direction and the end face of the second side plate 103b in the shorter direction of the rod lens array unit 101. The width of the second principal surface 104c is shown as D2.

The boundary of the first principal surface 102c and the second principal surface 104c is located within a range shown as the first distance D1.

The distance (face spacing) between the first principal surface 102c and the second principal surface 104c in the shorter direction is the second distance D3 as described above. Since the second distance D3 is D3>0, a step 104d is formed on both sides of the rod lens array unit 101 in the shorter direction as a step part.

The width Z1 between the first principal surfaces 102c provided on both sides of the rod lens array unit 101 in the shorter direction is a final finished width of the rod lens array unit 101.

It is preferable that the first distance D1, which is a distance between the side face of the rod lens array 102b and the first side plate 103a, and the first distance D1, which is a distance between the side face of the rod lens array 102b and the second side plate 103b be, for example, 0.1 mm≤D1≤1.0 mm. It is preferable that the second distance D3 be, for example, 0 mm≤D3≤1.0 mm.

The rod lens array 102b in which a plurality of rod lenses 102a are arranged in an array (array form) has a refractive index distribution. For the rod lens 102a, for example, plastic materials are used, and acrylic resins including methacrylate (MMA), polymethyl methacrylate (PMMA), etc., can be used. Further, in this specification, an "array" includes the meaning of a linear (or straight) arrangement, a curved (or waved) arrangement, a zigzag arrangement, etc.

For the first side plate 103a and the second side plate 103b, materials low in machinability are used, and for example, glass cloth epoxy resin, glass, ceramics, phenol resin, epoxy resin, acrylic resin, ABS resin (for example, an ABS resin in which glass fillers are added), etc., can be used.

In this specification, "materials low in machinability" refers to materials including materials in which the Vickers hardness is 100 HV or higher. Further, "materials low in machinability" is also referred to as "materials poor in machinability".

It is preferable that the first side plate 103a and the second side plate 103b be small in linear expansion coefficient for temperature and humidity. Specifically, it is preferable that the value of the linear expansion coefficient for temperature and humidity, etc., for the first side plate 103a and the second side plate 103b be, for example, 15 ppm/° C. or lower. It is preferable that the water absorption rate of the first side plate 103a and the second side plate 103b be, for example, 0.1% or lower.

For the filling adhesive forming the filling adhesive layer 104 (including the first filling adhesive layer 104a and the second filling adhesive layer 104b), for example, silicone adhesive, epoxy adhesive, urethane adhesive, etc., can be used. In this specification, "the filling adhesive" includes the first filling adhesive and the second filling adhesive.

However, even in the case of using any of the materials, it is preferable that the filling adhesive as the first adhesive has a curing shrinkage ratio of 3% or lower. That is to reduce the effects of the optical characteristics, etc., of the rod lens array 102b with the stress caused by the curing shrinkage. Further, it is preferable that the water absorption rate of the first filling adhesive layer 104a and the second filling adhesive layer 104b be, for example, 0.1% or lower.

According to the rod lens array unit 101 of Embodiment 1, the end faces of the first side plate 103a and the second side plate 103b in the optical axis direction of the rod lens array 102b are positioned inside the end face of the rod lens array 102b in the optical axis direction of the rod lens array 102b. This prevents dust, etc., adhered to the periphery of the rod lens array 102b (for example, second principal surface 104c) from adhering to the end face of the rod lens array 102b, realizing a stable optical performance of the rod lens array unit 101. The optical axis direction (or shorter direction) is shown with Y, the perpendicular direction (or longer direction) with respect to X is shown with X. X direction may be referred as a main scanning direction. The thick direction with respect to X and Y directions is shown with Z.

By using materials low in machinability or materials small in linear expansion coefficient for temperature and humidity for the first side plate 103a and the second side plate 103b, a rod lens array unit 101 small in size variation regardless of a change in operating environment (surrounding environment), such as, e.g., a change in temperature or a change in humidity, and a change in temperature from self-heating, can be provided.

<Production Method of Rod Lens Array Unit 101>

Generally, for a rod lens constituting a rod lens array, there are a lens made of a glass material and a lens made of a plastic material. In the production method of the rod lens array using such a rod lens, since there may be variations in the position or the shape of the tips of the plurality of rod lenses in the optical axes arranged in a predetermined direction, the tips (end faces) of the rod lens parts of the rod lens arrays in the optical axis direction eventually need to be evenly leveled. Therefore, for example, in a rod lens array using rod lenses made of a glass material, the rod lens end faces are finished by polishing the tip of the rod lens part. Further, in a rod lens array made of a plastic material, for example, the finishing of the rod lens end faces is performed by cutting the tip of the rod lens using a linear cutter equipped with cutting blades.

The method for finishing the lens cross-section in which the tip of the rod lens made of a plastic material is cut using a linear cutter can simplify the production step in comparison to the method of finishing the rod lens cross-section in which the tip of the rod lens part made of a glass material is polished. Therefore, the production efficiency of the rod lens array can be improved by producing rod lens arrays using rod lenses made of a plastic material. However, when cutting the tips of the rod lenses of rod lens arrays using a linear cutter, in a conventional production method of rod lens array units, it was difficult to only cut the rod lens part of the rod lens array. Therefore, in some cases, the side plates, etc., arranged around the rod lens parts also had to be cut. Therefore, it is desirable that the side plates, etc., arranged around the rod lenses be constituted by a material that does not damage the cutting blade of the linear cutter.

For the side plate arranged around the rod lenses, a plate material, such as, e.g., phenol resin, ABS resin, epoxy resin, and acrylic resin, is used. In the case of using such material for the side plate, there was a problem that the dimensional variations in the rod lens array unit occurred due to the changes in the operation environment such as a change in humidity or a change in temperature.

Therefore, as explained in the aforementioned <Structure of Rod Lens Array Unit 101>, by using a material low in machinability for the first side plate 103a and the second side plate 103b, the dimensional variations of the rod lens array unit 101 can be decreased regardless of the change in operational environment such as a change in humidity and a change in temperature.

However, when producing such a rod lens array unit 101, in the finishing step of the rod lens end face using a linear cutter, it is desirable that damages to the cutting blade from contacting the material low in machinability (for example, side plate including glass materials) be avoided. Therefore, next, a production method of the rod lens array unit 101 in consideration of a case in which a material low in machinability are used for the first side plate 103a and the second side plate 103b will be explained.

The method of producing the rod lens array unit 101 includes the following steps:

respectively fixing a first side face and a second side face of the rod lens array 102b including a plurality of rod lenses 102a to the first side plate 103a as a first side plate and the second side plate 103b as a second side plate with adhesive;

forming a slit 107 as a first long notch that penetrates the first side plate 103a;

forming, at a position corresponding to the slit 107, another slit 107 as a second long notch that penetrates the second side plate 103b; and cutting, in the slit 107 as a second long notch, the first side plate 103a, the second side plate 103b, and the rod lens array 102b with a cutting width D7 narrower than a width D6 of the first long notch and the width D6 of the second long notch.

These steps will be specifically explained.

<Step a1: First Filling Adhesive Application Step>

Figure 3A:
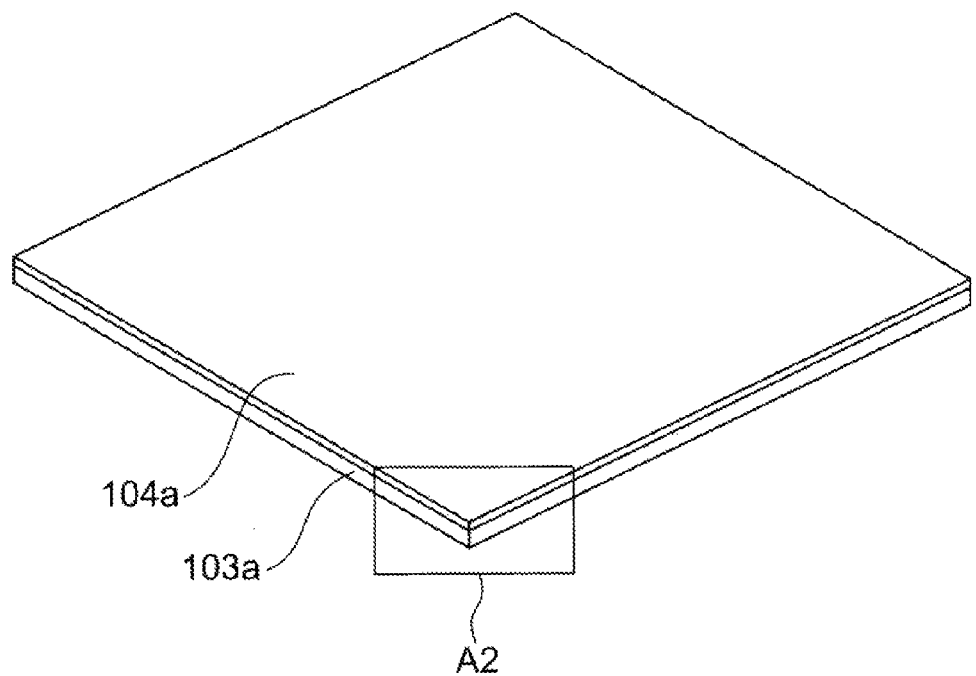
FIG. 3A shows a first filling adhesive application step in the production method of the rod lens array unit according to Embodiment 1.
Figure 3B:
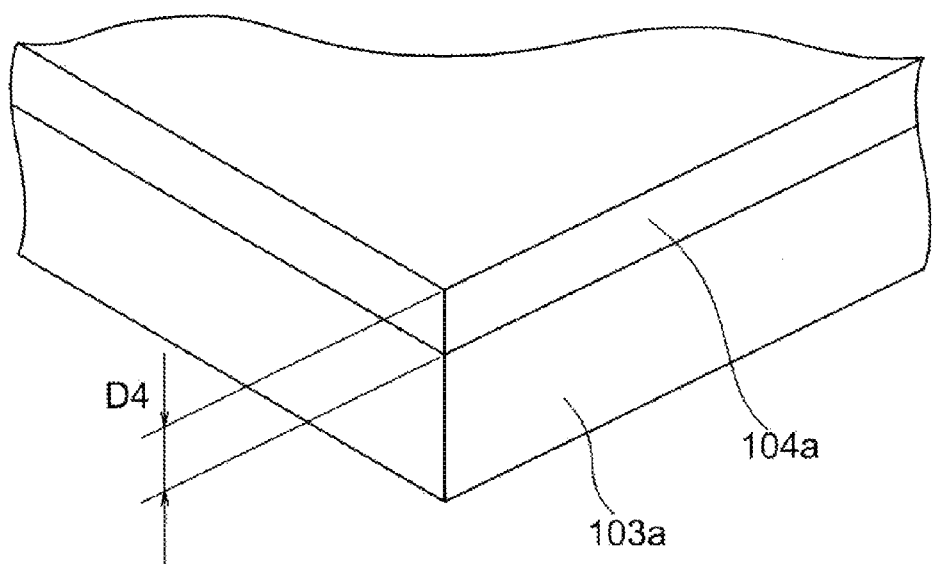
FIG. 3B is an enlarged perspective view showing a partial region of a first side plate and a first filling adhesive layer shown in FIG. 3A.

FIG. 3A shows a first filling adhesive application step in the production method of the rod lens array unit 101 according to Embodiment 1, and FIG. 3B is an enlarged perspective view showing a partial region A2 of the first side plate 103a and the first filling adhesive layer 104a as shown in FIG. 3A.

As shown in FIG. 3A and FIG. 3B, a first filling adhesive is applied to the surface of the first side plate 103a to form a first filling adhesive layer 104a. It is desired that the first filling adhesive be in liquid form. It is desired that the film thickness D4 of the first filling adhesive layer 104a be set to be thicker (longer) than the first distance D1 so that the first distance D1, which is the distance (interval) between the side face of the rod lens array 102b (side faces of the plurality of rod lenses 102a) and the first side plate 103a, is secured. Further, it is preferable that the film thickness D4 of the first filling adhesive layer 104a be at a degree of a film thickness causing no gap between the outer circumferential surface of the rod lens array 102b and the first side plate 103a.

<Step b1: Rod Lens Arrangement Step>

Figure 4A:
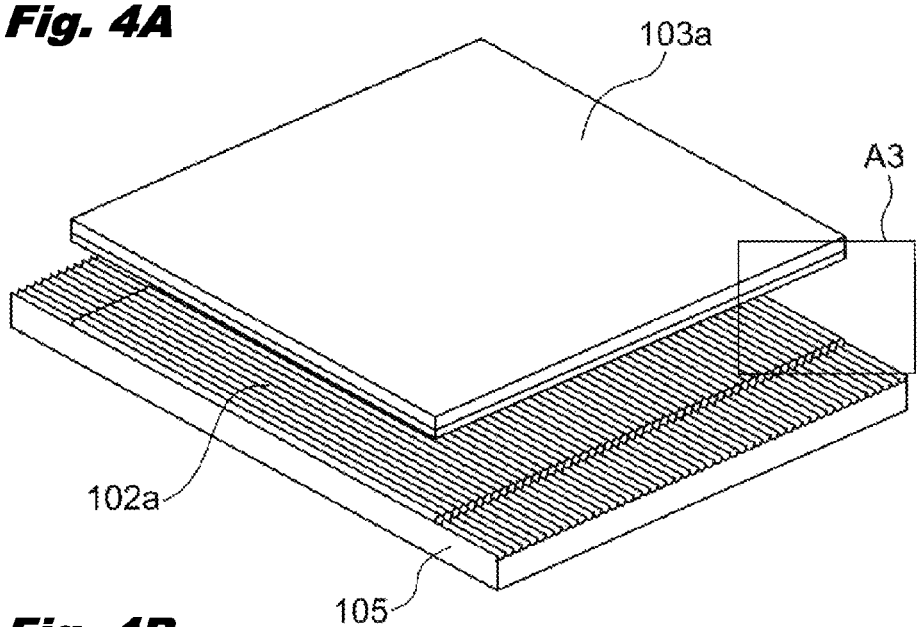
FIG. 4A shows a rod lens arrangement step of the production method of the rod lens array unit according to Embodiment 1.
Figure 4B:
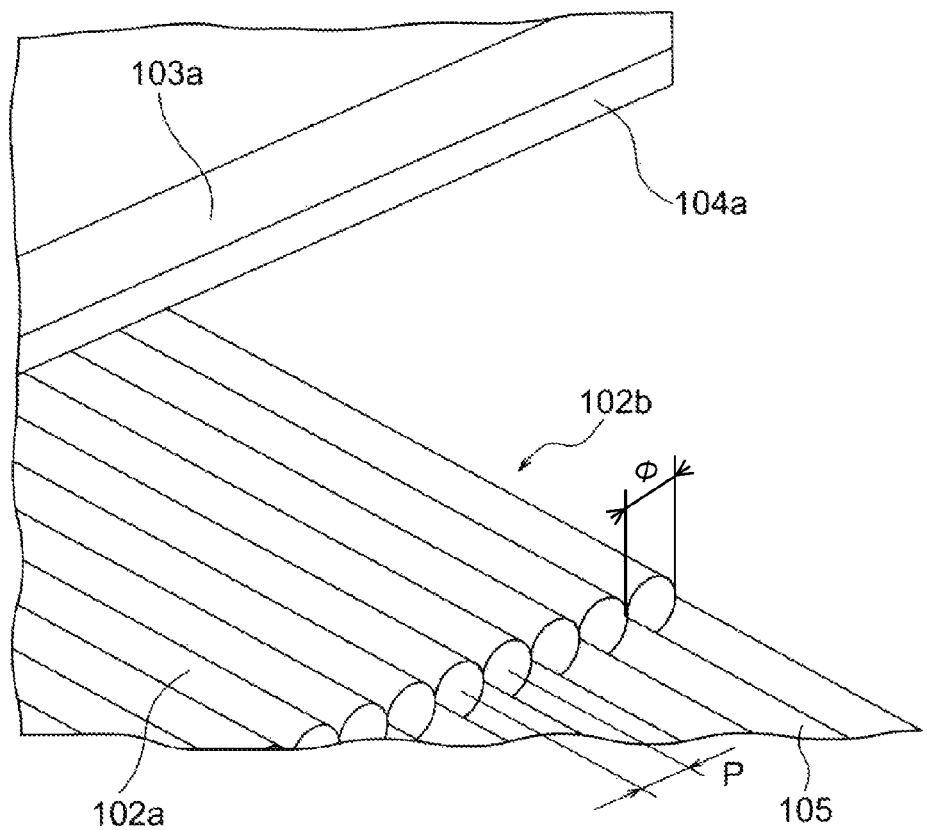
FIG. 4B is an enlarged perspective view showing a partial region of the plurality of rod lenses arranged on an array board shown in FIG. 4A.

FIG. 4A shows a rod lens arrangement step of the production method of the rod lens array unit 101 according to Embodiment 1, and FIG. 4B is an enlarged perspective view showing a partial region A3 of the plurality of rod lenses 102a arranged on the array board 105 shown in FIG. 4A.

As shown in FIG. 4A and FIG. 4B, a plurality of rod lenses 102a are arranged on the array board 105 in which a plurality of grooves (ditches) are formed in a manner such that the array pitches P of the plurality of rod lenses 102a are constant. The grooves of the array board 105 can be made by, for example, cutting or etching a board in which the main material is aluminum or glass, in consideration of the shapes and the dimensions of the rod lenses 102a.

By arranging the plurality of rod lens 102a in an orthogonal direction of each of the optical axes of the plurality of rod lenses 102a, the rod lens array 102b can be obtained.

<Step c1: Rod Lens Bonding Step Step>

Figure 5A:
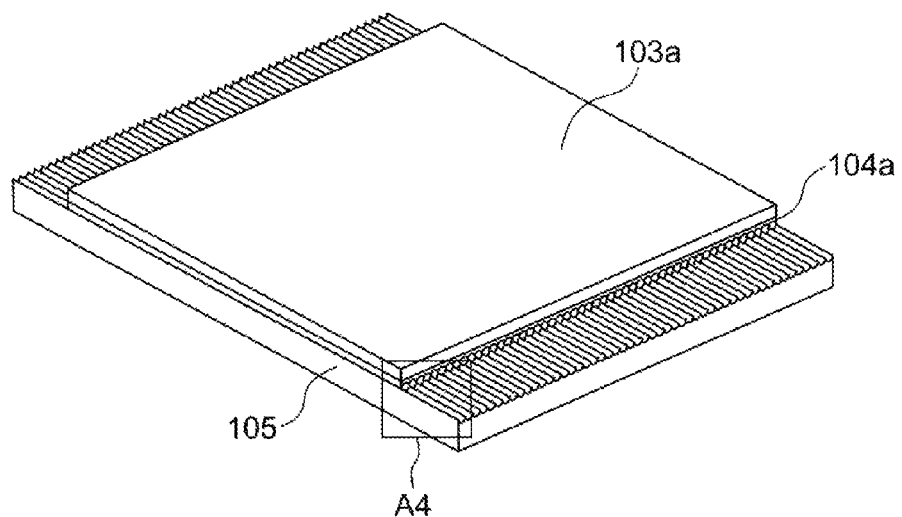
FIG. 5A shows a rod lens bonding step in the production method of the rod lens array unit according to Embodiment 1.
Figure 5B:
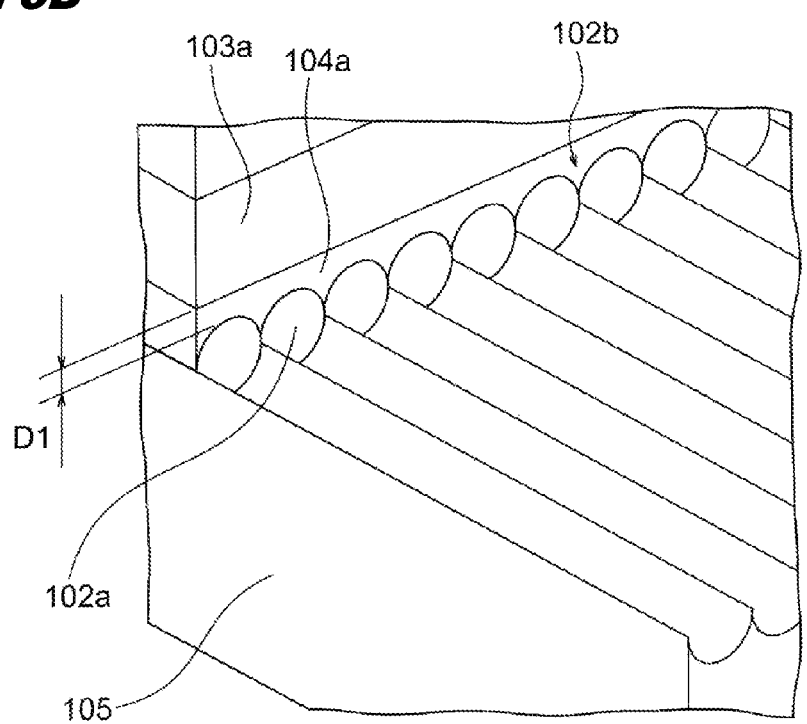
FIG. 5B is an enlarged perspective view showing a partial region of the plurality of rod lenses adhered to the first filling adhesive layer shown in FIG. 5A.

FIG. 5A shows a rod lens bonding step in the production method of the rod lens array unit 101 according to Embodiment 1, and FIG. 5B is an enlarged perspective view showing a partial region A3 of the plurality of rod lenses 102a adhered to the first filling adhesive layer 104a shown in FIG. 5A.

A surface of the first side plate 103a in which the first filling adhesive layer 104a is formed is put in close contact with a side face (first side face) of the plurality of rod lenses 102a (rod lens array 102b) arranged on the array board 105 to adhere the rod lens array 102b to the first filling adhesive layer 104a.

When adhering the rod lens array 102b to the first filling adhesive layer 104a, for example, the first side plate 103a is pressed using a pressing machine to press-bond the first filling adhesive layer 104a and the rod lens array 102b. When press-bonding, it is preferable that a load control and positioning be performed for the press-bonding so that the first distance D1 between the rod lens array 102b and the inner surface of the first side plate 103a is secured.

When the viscosity of the first filling adhesive layer 104a is a low viscosity such as, for example, 10 [Pa·s] or lower, in this step c1, the first filling adhesive layer 104a may be preheated to increase the viscosity of the first filling adhesive layer 104a or to harden the first filling adhesive layer 104a. By increasing the viscosity of the first filling adhesive layer 104a or by hardening the first filling adhesive layer 104a, the variations in the first distance D1 and the pitch P in the later steps can be suppressed.

<Step d1: Rod Lens Transfer Step>

Figure 6A:
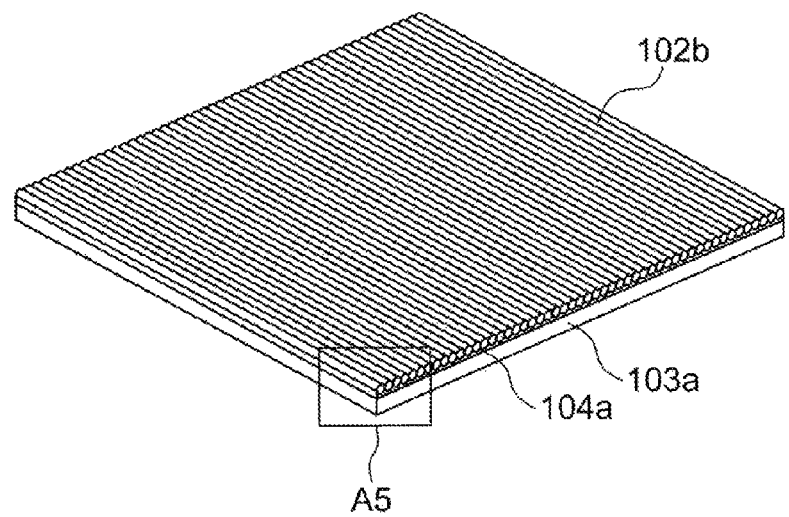
FIG. 6A shows a rod lens transfer step in the production method of the rod lens array unit according to Embodiment 1.
Figure 6B:
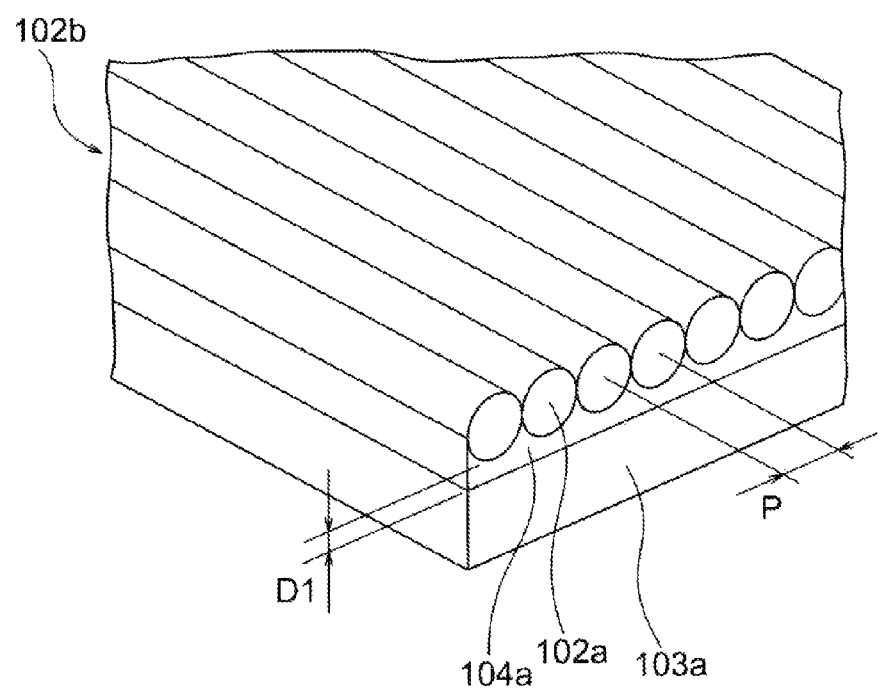
FIG. 6B is an enlarged perspective view showing a partial region of the rod lens array fixed to the first side plate and the first filling adhesive layer shown in FIG. 6A.

FIG. 6A shows a rod lens transfer step in the production method of the rod lens array unit 101 according to Embodiment 1, and FIG. 6B is an enlarged perspective view showing a partial region A5 of the rod lens array 102b fixed to the first side plate 103a and the first filling adhesive layer 104a shown in FIG. 6A.

By pulling up the first side plate 103a to which the rod lens array 102b is fixed from the array board 105, the rod lens array 102b is moved (transferred) onto the first filling adhesive layer 104a from the array board 105. For the purpose of suppressing the variations in the first distance D1 or the pitch P in later steps, the first filling adhesive layer 104a may be preheated in this step d1.

<Step e1: Second Filling Adhesive Application Step>

Figure 7A:
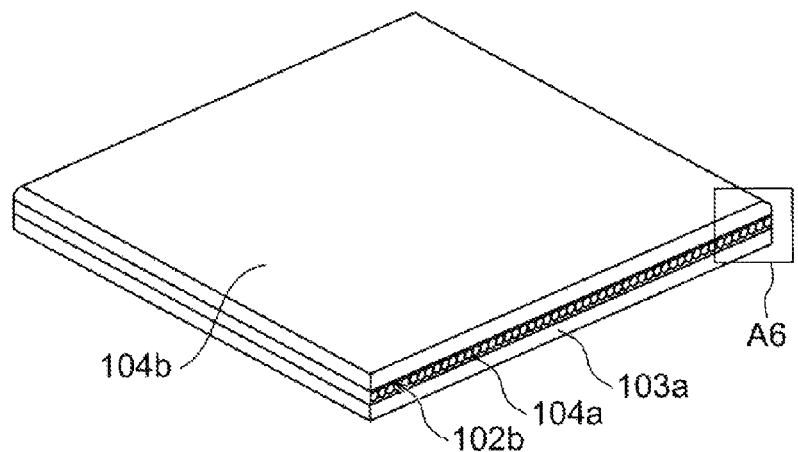
FIG. 7A shows a second filling adhesive application step in the production method of the rod lens array unit according to Embodiment 1.
Figure 7B:
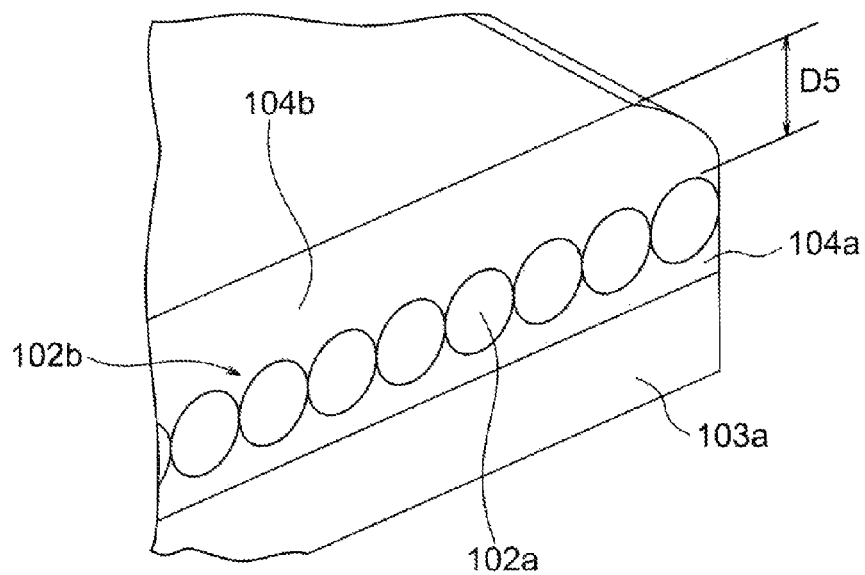
FIG. 7B is an enlarged perspective view showing a partial region of a second filling adhesive layer formed on the rod lens array shown in FIG. 7A.

FIG. 7A shows a second filling adhesive application step in the production method of the rod lens array unit 101 according to Embodiment 1, and FIG. 7B is an enlarged perspective view showing a partial region A6 of the second filling adhesive layer 104b formed on the rod lens array 102b shown in FIG. 7A.

A second filling adhesive is applied to the side face (second side face) of the rod lens array 102b obtained in step d1 to form a second filling adhesive layer 104b. It is preferable that the second filling adhesive be in liquid form. It is preferable that the film thickness D5 of the second filling adhesive layer 104b be set to be thicker (longer) than the first distance D1 so that the first distance D1 between the rod lens array 102b and the second side plate 103b is secured in the later step (step f1: second side plate adhering step) when the second side plate 103b and the rod lens array 102b are fixed. Further, it is preferable that the film thickness D5 of the second filling adhesive layer 104b be at a degree of a film thickness causing no gap between the rod lens array 102b and the second side plate 103b.

<Step f1: Second Side Plate Bonding Step>

Figure 8A:
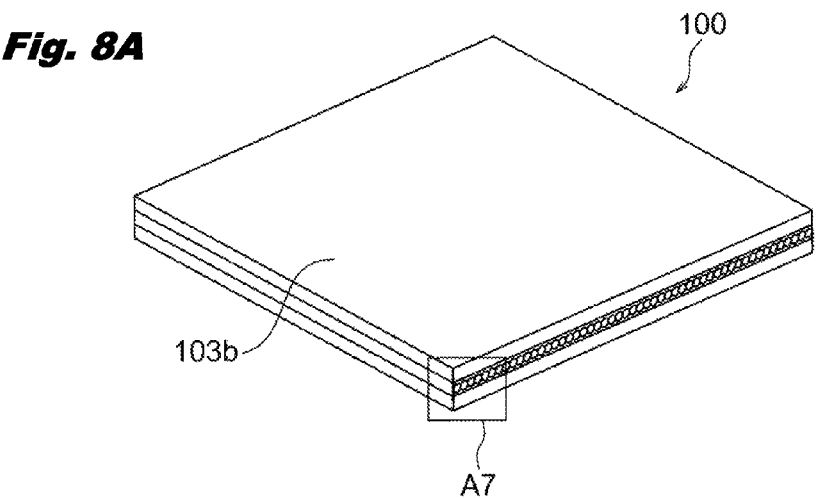
FIG. 8A shows a second side plate bonding step in the production method of the rod lens array unit according to Embodiment 1.
Figure 8B:
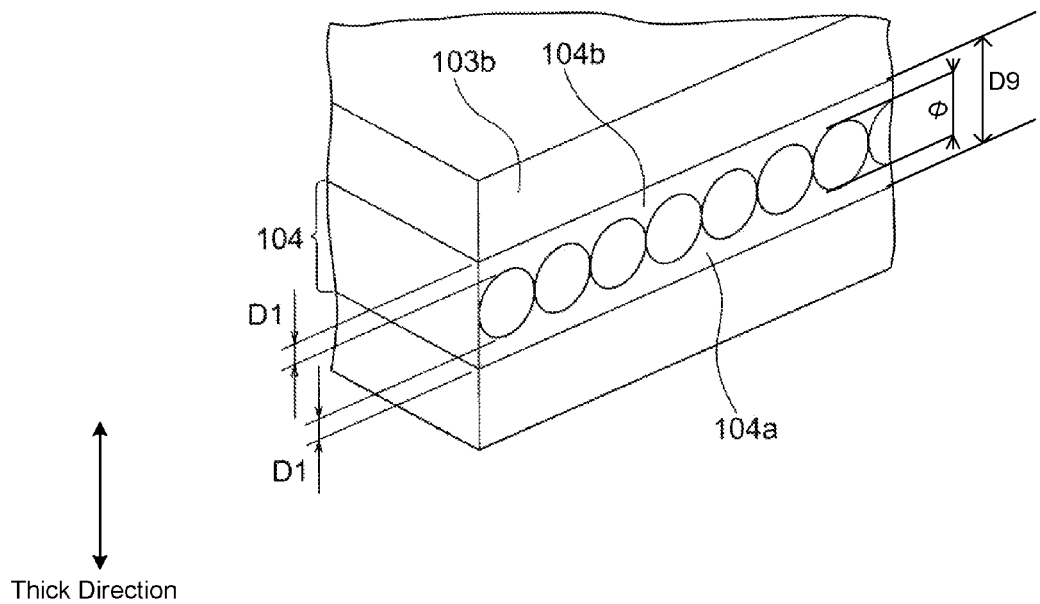
FIG. 8B is an enlarged perspective view showing a partial region of a rod lens array sheet shown in FIG. 8A.

FIG. 8A shows a second side plate bonding step in the production method of the rod lens array unit 101 according to Embodiment 1, and FIG. 8B is an enlarged perspective view showing a partial region A7 of the rod lens array sheet 100 shown in FIG. 8A.

In Step f1, the side faces of the second filling adhesive layer 104b and the second side plate 103b are adhered to produce the rod lens array sheet 100.

When adhering the second side plate 103b and the second filling adhesive layer 104b, it is desired that a load control and positioning be performed for the press-bonding so that the first distance D1 between the rod lens array 102b and the inner surface of the second side plate 103b is secured. When the viscosity of the second filling adhesive layer 104b is a low viscosity such as, for example, 10 [Pa·s] or lower, in this step f1, the second filling adhesive layer 104b may be preheated to increase the viscosity of the second filling adhesive layer 104b or to harden the second filling adhesive layer 104b. By increasing the viscosity of the second filling adhesive layer 104b, variations of the first distance D1 can be suppressed.

<Step g1: Slit Forming Step>

Figure 9A:
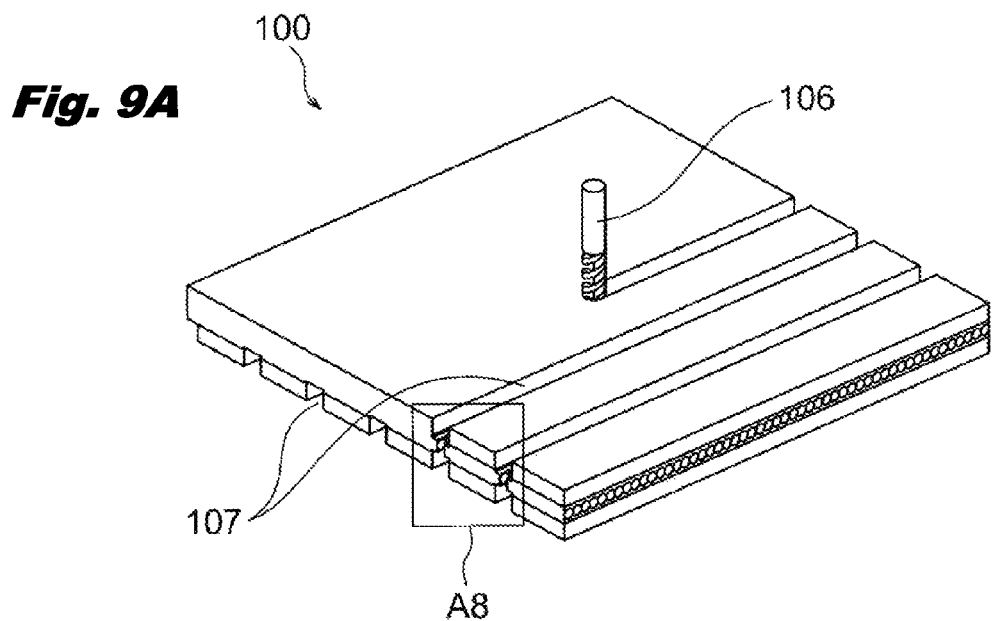
FIG. 9A shows a slit forming step in the production method of the rod lens array unit according to Embodiment 1.
Figure 9B:
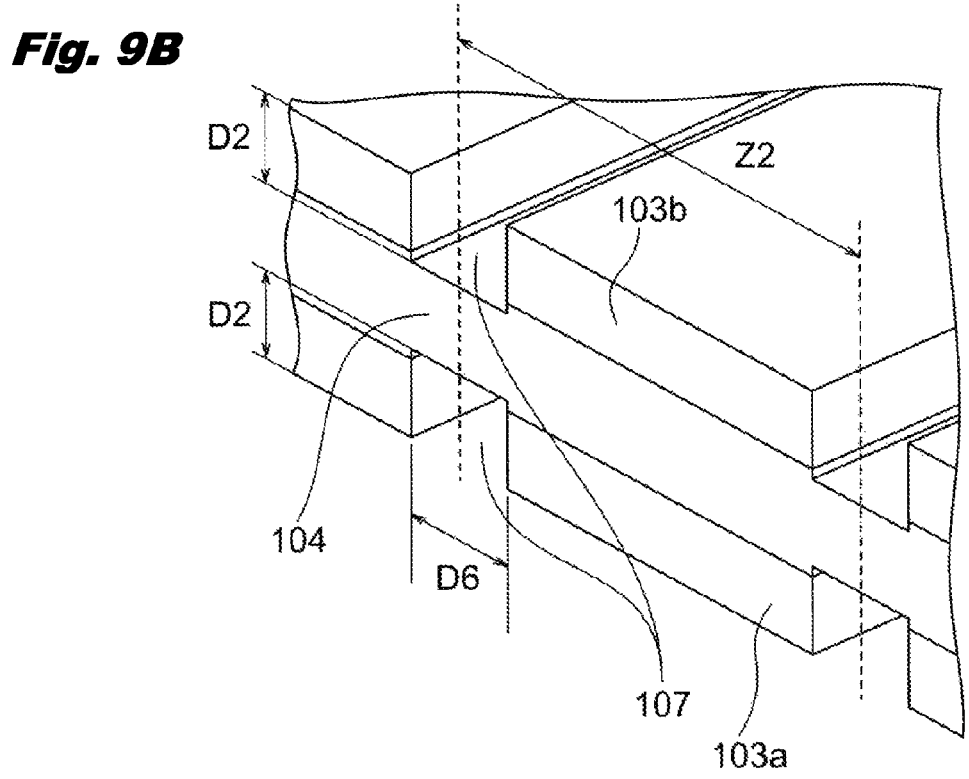
FIG. 9B is an enlarged perspective view showing a partial region of the rod lens array sheet shown in FIG. 9A.

FIG. 9A shows a slit forming step in the production method of the rod lens array unit 101 according to Embodiment 1, and FIG. 9B is an enlarged perspective view showing a partial region A8 of the rod lens array sheet 100 shown in FIG. 9A.

For example, using an end mill 106, a plurality of slits 107 each having a slit width D6 and a depth D2 are formed on both sides of the rod lens array sheet 100 (surfaces of the first side plate 103a and the second side plate 103b). The plurality of slits 107 are formed so that the pitches (widths Z2) of the plurality of slits 107 are constant along a direction parallel to the optical axis direction of the rod lens array 102b. The slit width D6 shows a length in a direction parallel to the optical axis direction of the rod lens array 102b. The depth D2 shows a length in a direction orthogonal to the optical axis direction of the rod lens array 102b.

The slit width D6 is set to be longer than a width D7, which is a cutting width when cutting the rod lens array sheet 100 in a later step (step h1: cutting step). The central position of the slit width D6 is a cutting position of the rod lens array sheet 100 in a later step (step h1: cutting step).

The depth D2 is a depth in which at least the first side plate 103a and the second side plate 103b are completely cut (penetrated) in the slit 107 and may be set to a degree of a depth causing no damage to the surface of the rod lens array 102b. In other words, the depth D2 is set to a depth in which the bottom part of the slit 107 is positioned within the range of the first distance D1.

The width Z2 may be determined in consideration of the width D8 for cutting and finishing the end face of the rod lens array 102b in the optical axis direction in a later step (step h1: cutting step). Herein, the width Z2 is determined from the center point of one slit width D6 to the center point of another slit width D6 in the optical axis direction (X).

<Step h1: Cutting Step>

Figure 10A:
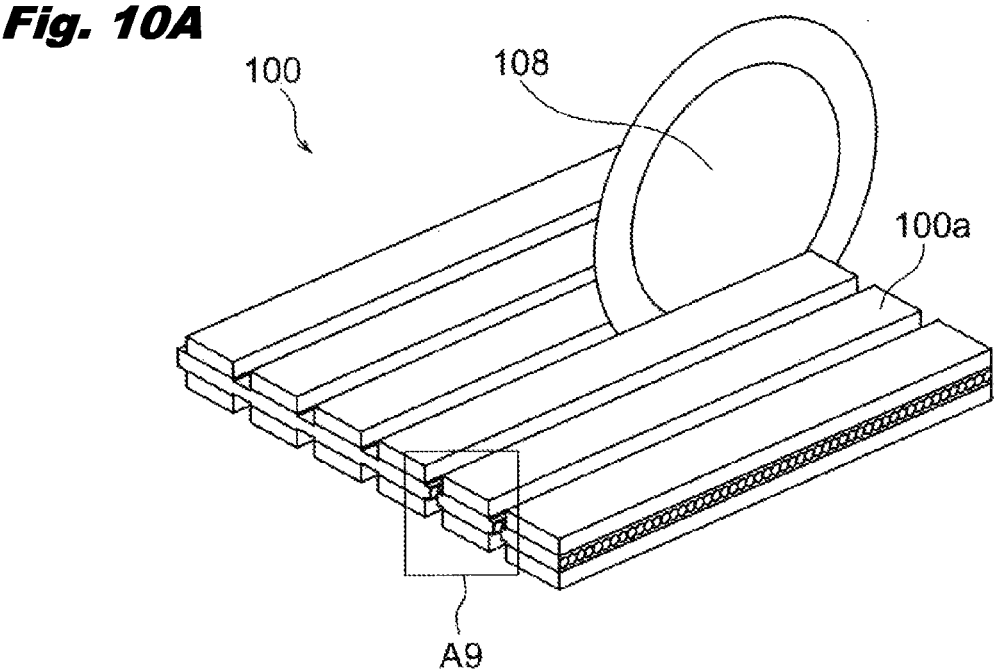
FIG. 10A shows a cutting step in the production method of the rod lens array unit according to Embodiment 1.
Figure 10B:
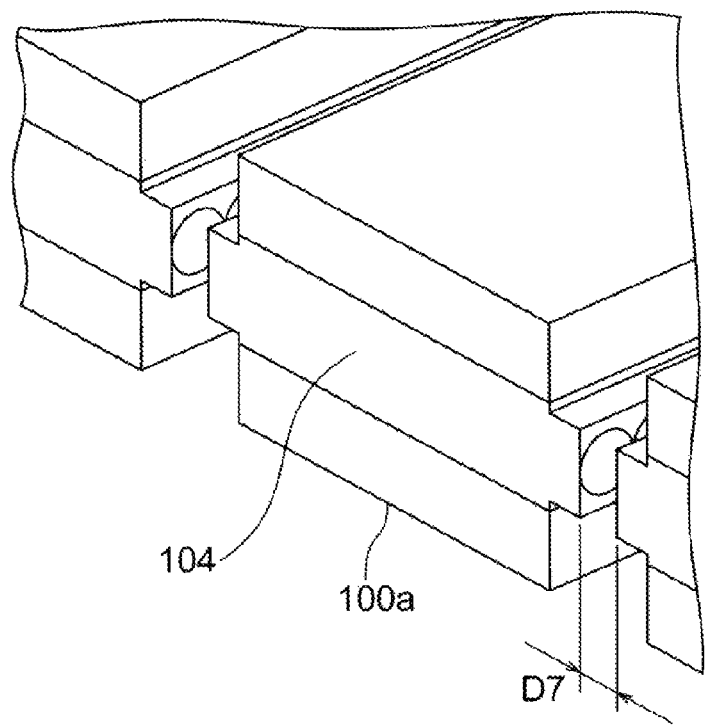
FIG. 10B is an enlarged perspective view showing a partial region of the cut rod lens array sheet shown in FIG. 10A.

FIG. 10A shows a cutting step in the production method of the rod lens array unit 101 according to Embodiment 1, and FIG. 10B is an enlarged perspective view showing a partial region A9 of the cut rod lens array sheet 100a as shown in FIG. 10A.

For example, using a dicing saw 108, the rod lens array sheet 100 is cut so that the cut width is a width D7 which is narrower than the slit width D6 at the central position of the slit width D6 formed in step g1. By cutting the rod lens array sheet 100, both end faces (cross-sections) of the rod lens array 102b in the optical axis direction are formed. The width D7 may be set to a width (length) in which a cutting blade 110 fixed to a tip of a later explained cutter wheel 109 does not come in contact with the first side plate 103a and the second side plate 103b when the end face of the rod lens array 102b in the optical axis direction is cut by a width D8 in a later step (step i1: cutting step).

<Step i1: Cutting Step>

Figure 11A:
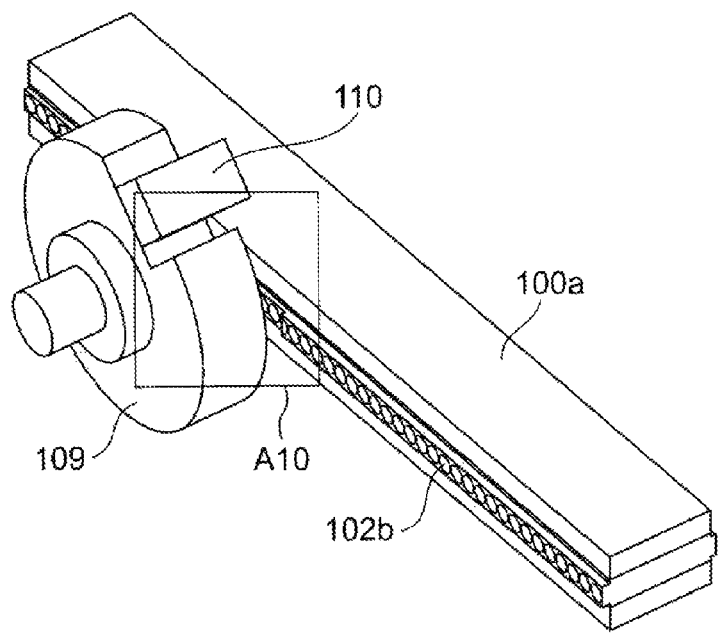
FIG. 11A shows a cutting step in the production method of the rod lens array unit according to Embodiment 1.
Figure 11B:
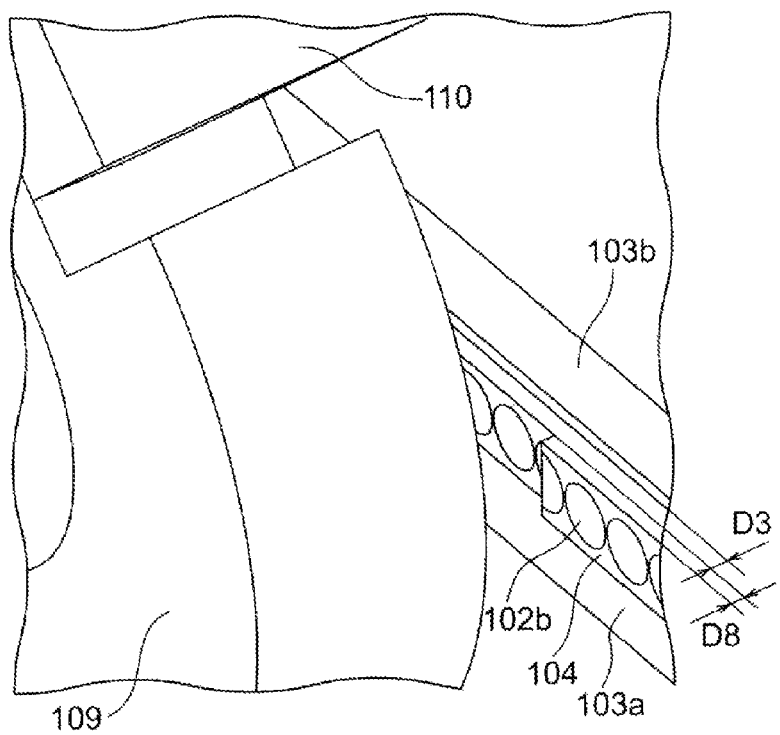
FIG. 11B is an enlarged perspective view showing a partial region of the cut rod lens array sheet shown in FIG. 11A.

FIG. 11A shows a cutting step in the production method of the rod lens array unit 101 according to Embodiment 1, and FIG. 11B is an enlarged perspective view showing a partial region A10 of the cut rod lens array sheet 100a as shown in FIG. 11A.

Both of the end faces (cross-sections) in the optical axis direction of the rod lens array 102b formed in step h1, for example, are cut only by the width D8 using a cutting blade 110 to perform mirror finishing on both end faces of the rod lens array 102b in the optical axis direction. By performing mirror finishing on both end faces of the rod lens array 102b in the optical axis direction, the width Z1 in the shorter direction of the rod lens array unit 101 is determined. The width D8 may be determined in consideration of the width Z1 at the time of the final finishing.

The rod lens array unit 101 is completed according to the aforementioned steps. In the production method of the rod lens array unit 101 explained above, an example in which a plurality of rod lenses 102a are arranged in one line in the main scanning direction (direction that is orthogonal to the optical axes of the plurality of rod lenses 102a) in one rod lens array unit 101, but the number of the arrays of the plurality of rod lenses 102a is not limited to one.

For example, when stacking two arrays of rod lens arrays 102b in the main scanning direction, similarly to the method explained from step a1 to step d1, a plurality of rod lenses 102a arranged as the first array is adhered to the first filling adhesive layer 104a, and further, a plurality of rod lenses 102a arranged as the second array is arranged on the first array of the plurality of rod lenses 102a. When arranging the second array of the plurality of rod lenses 102a on the first array of the plurality of rod lenses 102a, the second array of the plurality of rod lenses 102a may be stacked on the first array of the plurality of rod lenses 102a so that the first array of the plurality of rod lenses 102a and the second array of the plurality of rod lenses 102a are arranged in a manner such that they are displaced by P/2 from each other in the main scanning direction.

After arranging the second array of the plurality of rod lenses 102a on the first array of the plurality of rod lenses 102a, the second filling adhesive layer 104b is formed on the second array of the plurality of rod lenses 102a in the same manner as in step e1, and the gap between the second array of plurality of rod lenses 102a is filled with the second filling adhesive layer 104b. For the purpose of adhesive-curing this stacked structure, the second filling adhesive layer 104b may be subjected to both of or one of heat processing and moisturizing. The following steps may be the same as step f1 to step i1.

According to the production method of the rod lens array unit 101 according to Embodiment 1, a filling adhesive layer 104 in which the first distance D1 is secured between the rod lens array 102b, and the first side plate 103a and the second side plate 103b is formed, so that damages to the side face of the rod lens array 102b can be suppressed when processing the slit on the first side plate 103a and the second side plate 103b (step g1).

Even when the first side plate 103a and the second side plate 103b including a material low in linear expansion coefficient for temperature and humidity or a material low in machinability is used for the rod lens array unit 101, the slit processing (step g1) is performed so that both end faces of the first side plate 103a and the second side plate 103b in the optical axis direction of the rod lens array unit 101 are positioned inside both end faces of the rod lens array 102b in the optical axis direction. Therefore, when performing mirror finishing (step i1) of both end faces of the rod lens array 102b in the optical axis direction, damages to the cutting blade of the cutting apparatus (for example, linear cutter) can be suppressed.

Embodiment 2

<Structure of Rod Lens Array Unit 201>

Figure 12:
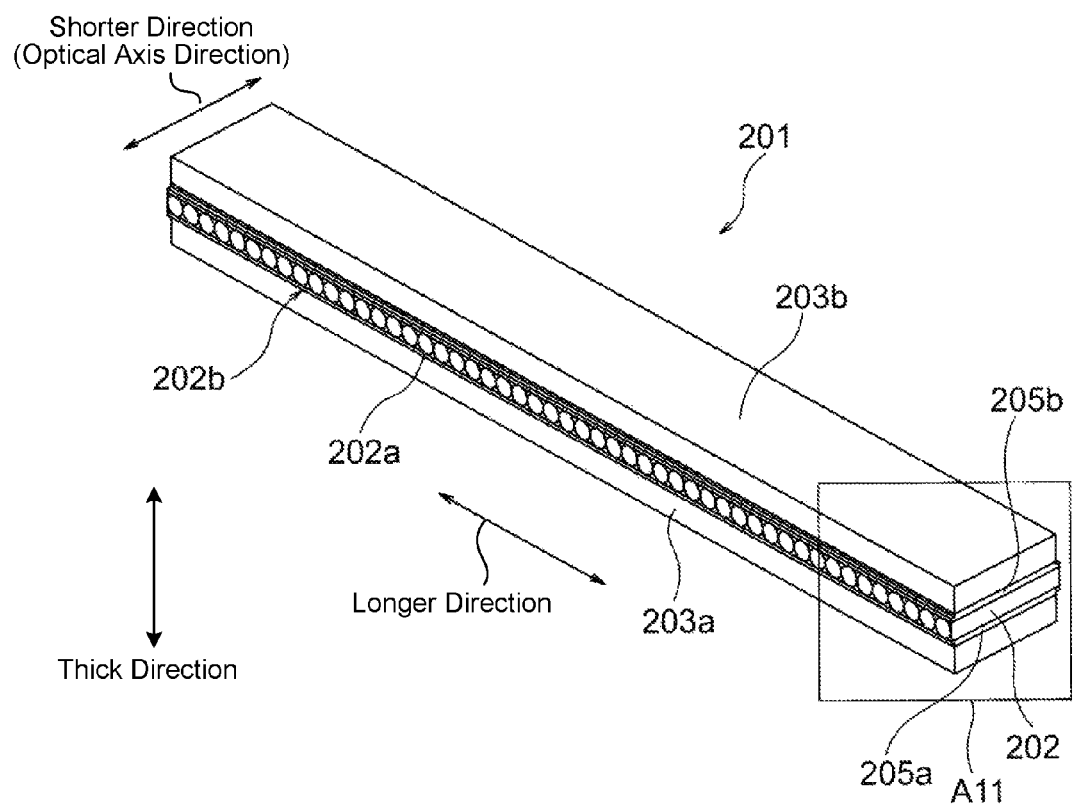
FIG. 12 is a perspective view showing a rod lens array unit according to Embodiment 2 of the present invention.
Figure 13:
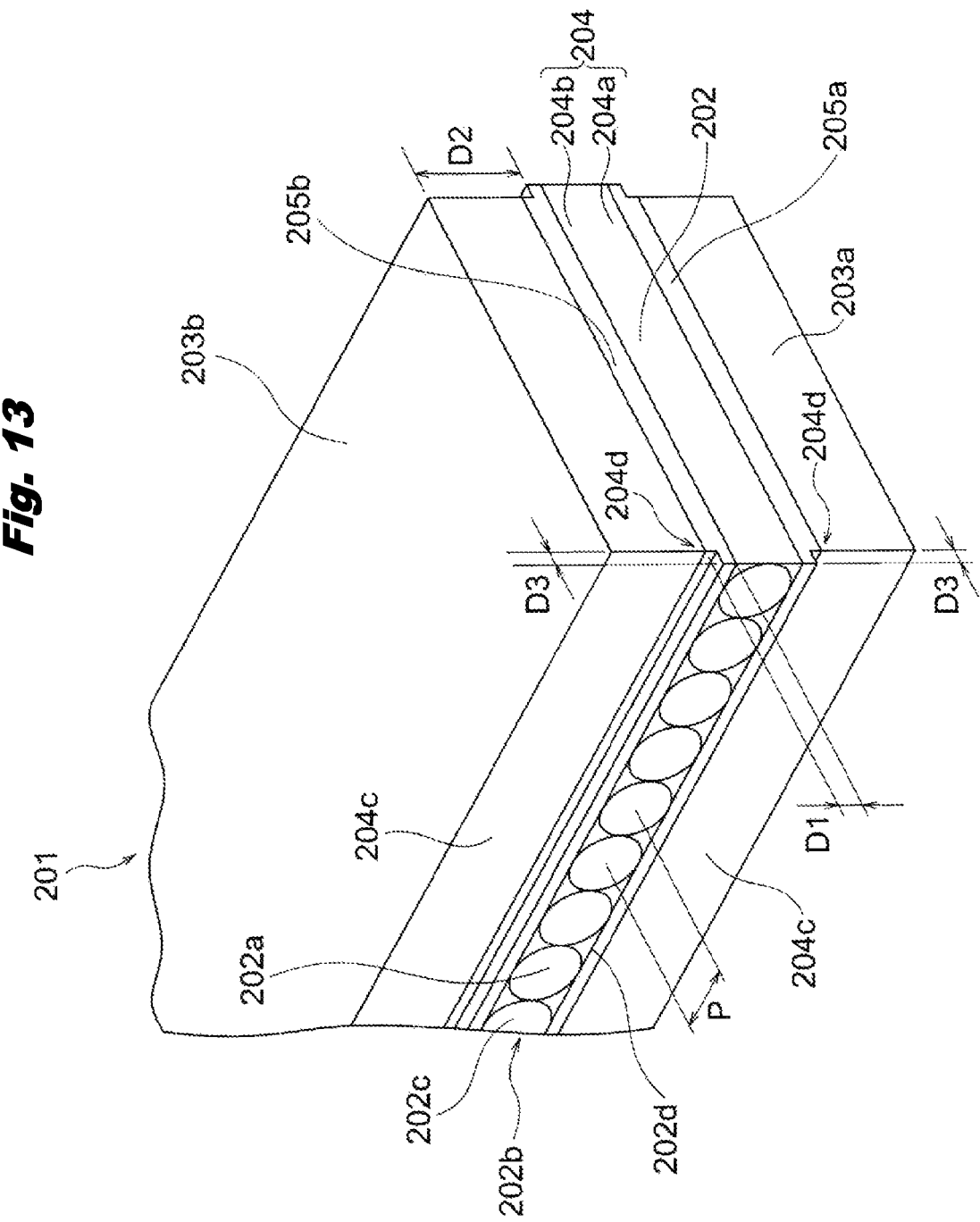
FIG. 13 is an enlarged perspective view showing a partial region of the rod lens array unit shown in FIG. 12.

FIG. 12 is a perspective view showing a rod lens array unit 201 according to Embodiment 2 of the present invention. FIG. 13 is an enlarged perspective view showing a partial region A11 of the rod lens array unit 201 shown in FIG. 12.

The rod lens array unit 201 as shown in FIG. 12 and FIG. 13 has a plane symmetry structure in which a plane passing through the optical axes of the plurality of rod lenses 202a is a symmetrical plane. In the rod lens array unit 201, since the structure of both end sides of the rod lens array unit 201 in the shorter direction are the same, only the structure of one end side will be explained and the explanation for the structure of the other end side will be omitted.

The rod lens array unit 201 includes a rod lens array 202b including a plurality of rod lenses 202a and a first side plate 203a and a second side plate 203b as a pair of side plate parts stacked in a manner such that the rod lens array 202b is sandwiched. The end faces of the first side plate 203a and the second side plate 203b in the optical axis direction of the rod lens array 202b are positioned inside the end faces of the rod lens array 202b in the optical axis direction of the rod lens array 202b.

The end faces of the rod lens array 202b form a first principal surface 202c, and the end faces of the first side plate 203a and the second side plate 203b form a second principal surface 204c. The first principal surface 202c and the second principal surface 204c are arranged on both sides of the rod lens array 202b in the optical axis direction, and the second principal surface 204c is positioned inside the first principal surface 202c in the optical direction of the rod lens array 202b.

The rod lens array unit 201 has a lamination structure in which a side face adhesive layer 205a as a second adhesive layer (first side face adhesive layer) and a side face adhesive layer 205b as a second adhesive layer (second side face adhesive layer) are stacked between the filling adhesive layer 204 (first filling adhesive layer 204a) and the first side plate 203a and between the filling adhesive layer 204 (second filling adhesive layer 204b) and the second side plate 203b, respectively. The side face adhesive layers 205a and 205b are made of a second adhesive, and the viscosity of the second adhesive before hardening is higher than the viscosity of the first adhesive forming the filling adhesive layer 204 before hardening. Further, in the example shown in FIG. 12 and FIG. 13, both side faces of the rod lens array 202b are adhered to the side face adhesive layers 205a and 205b, respectively.

The rod lens array unit 201 is provided between the first side plate 203a and the second side plate 203b, and has an adhesive part 202 for fixing the rod lens array 202b and the first side plate 203a and the second side plate 203b.

The adhesive part 202 includes a filling adhesive layer 204 as a first adhesive layer and side face adhesive layers 205a and 205b as second adhesive layers. The filling adhesive layer 204 is a layer in which a filling adhesive as a first adhesive is filled in the gap around the rod lens array 202b. The filling adhesive layer 204 includes a first filling adhesive layer 204a and a second filling adhesive layer 204b. The side face adhesive layer 205a is provided between the filling adhesive layer 204 (the first filling adhesive layer 204a) and the first side plate 203a and fixes the filling adhesive layer 204 (the first filling adhesive layer 204a) and the first side plate 203a. The side face adhesive layer 205a is provided between the filling adhesive layer 204 (the second filling adhesive layer 204b) and the second side plate 203b and fixes the filling adhesive layer 204 (the second filling adhesive layer 204b) and the second side plate 203b.

The rod lens array 202b and the adhesive part 202 form a protruded part 202d which protrudes outward of the second principal surface 204c in the optical axis direction of the rod lens array 202b. The protruded part 202d is formed on both end sides of the rod lens array unit 201 in the shorter direction and includes the region from the first principal surface 202c to the second principal surface 204c.

As shown in FIG. 13, the first principal surface 202c is a surface including the end face of the rod lens array 202b at both end sides in the shorter direction (optical axis direction of the rod lens array 202b) of the rod lens array unit 201, and is provided along the longer direction of the rod lens array unit 201.

The second principal surface 204c is a surface provided along the longer direction on both end sides of the rod lens array unit 201 in the shorter direction of the rod lens array unit 201. Specifically, the second principal surface 204c is a surface including a portion of the end face of the side face adhesive layer 205a of the rod lens array unit 201 in the shorter direction and the end face of the first side plate 203a of the rod lens array unit 201 in the shorter direction. The second principal surface 204c is also a surface including a portion of the end face of the side face adhesive layer 205b of the rod lens array unit 201 in the shorter direction and the end face of the second side plate 203b of the rod lens array unit 201 in the shorter direction. The width of the second principal surface 204c is shown as D2.

The boundary of the first principal surface 202c and the second principal surface 204c is located within the range shown as the first distance D1, which is a distance between the side face of the rod lens array 202b and the first side plate 203a (second side plate 203b).

The distance (face spacing) between the first principal surface 202c and the second principal surface 204c in the shorter direction is shown as a second distance D3. Since the second distance D3 is D3>0, a step 204d is formed on both sides of the rod lens array unit 201 in the shorter direction as a step part.

The rod lens array 202b in which a plurality of rod lenses 202a are arranged in an array has a refractive index distribution. For the rod lens 202a, for example, plastic materials are used.

As the material for forming the side face adhesive layers 205a and 205b, for example, silicone adhesive, epoxy adhesive, urethane adhesive, etc., in liquid or dry film form may be used. It is preferable that the adhesive for forming the side face adhesive layers 205a and 205b have a higher viscosity before hardening in comparison to the adhesive for forming the filling adhesive layer 204, and for example, it is preferable that the viscosity before hardening be 10 [Pa·s]. The film thickness D1 can may set as, for example, a thickness in the range of 0.1 mm to 1.0 mm. The materials used for the components other than the side face adhesive layers 205a and 205b of the rod lens array unit 201 may be the materials used for the components of Embodiment 1.

According to the rod lens array unit 201 of Embodiment 2, the end faces of the first side plate 203a and the second side plate 203b of the rod lens array 202b in the optical axis direction are positioned inside the rod lens array 202b than the end face of the rod lens array 202b in the optical axis direction of the rod lens array 202b. This prevents dust, etc., adhered to the periphery of the rod lens array 202b (for example, second principal surface 204c) from adhering to the end face of the rod lens array 202b, realizing a stable optical performance of the rod lens array unit 201.

By using a material low in machinability or a material small in linear expansion coefficient for temperature and humidity for the first side plate 203a and the second side plate 203b, a rod lens array unit 201 small in size variation regardless of the changes in operating environment (surrounding environment) such as a change in temperature or a change in humidity, a change in temperature from self-heating, etc., can be provided.

<Production Method of Rod Lens Array Unit 201>

Next, the production method of the rod lens array unit 201 will be explained.

The method of producing a rod lens array unit 201 includes the following steps:

respectively fixing a first side face and a second side face of a rod lens array 202b including a plurality of rod lenses 202a to a first side plate 203a as a first side plate and a second side plate 203b as a second side plate with adhesives;

forming a first long notch that penetrates the first side plate 203a; a step for forming, at a position corresponding to the first long notch, a second long notch that penetrates the second side plate 203b; and for cutting, in the second long notch, the first side plate 203a, the second side plate 203b, and the rod lens array 202b with a cutting width narrower than the width of the first long notch and the width of the second long notch.

The production method of the rod lens array unit 201 further includes a step for applying a first adhesive (a first filling adhesive and a second filling adhesive) to the rod lens array 202b and a step for applying a second adhesive to the first side plate 203a and the second side plate 203b. These steps will be specifically explained.

<Step a2: First Side Face Adhesive Layer Forming Step>

Figure 14A:
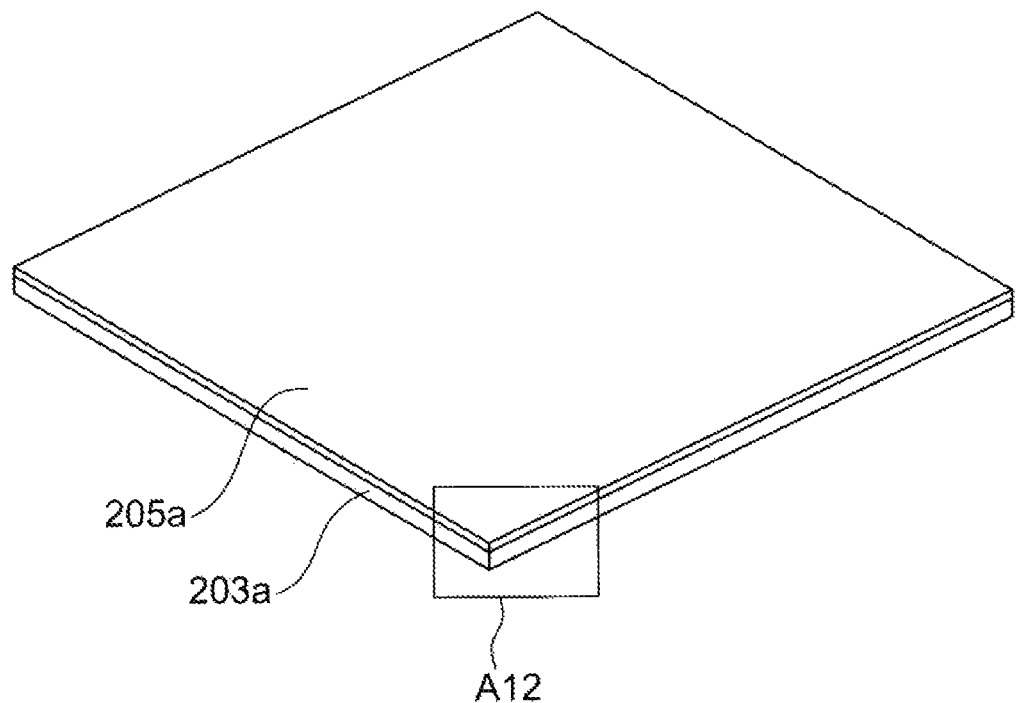
FIG. 14A shows a first side face adhesive layer forming step in the production method of the rod lens array unit according to Embodiment 2.
Figure 14B:
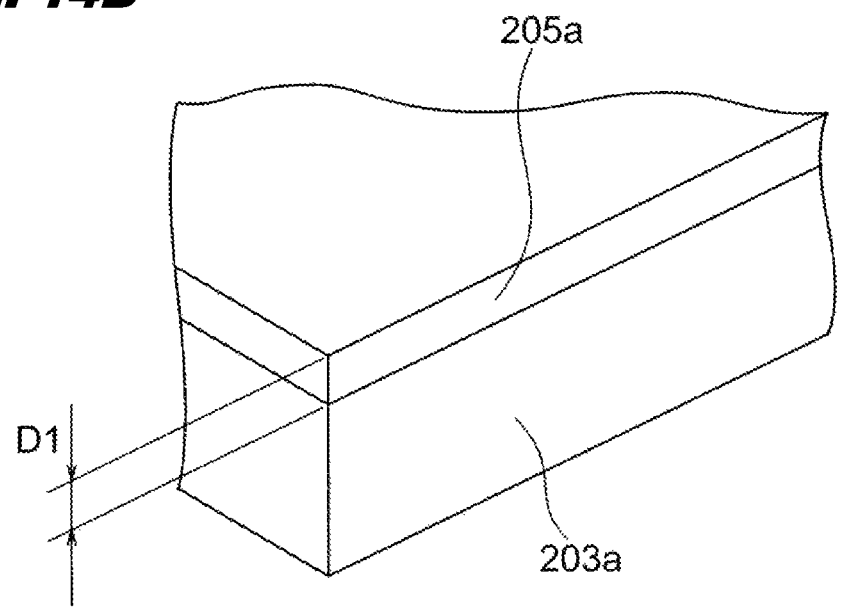
FIG. 14B is an enlarged perspective view showing a partial region of a first side plate in which a side face adhesive layer shown in FIG. 14A is formed.

FIG. 14A shows a first side face adhesive layer forming step in the production method of the rod lens array unit 201 according to Embodiment 2, and FIG. 14B is an enlarged perspective view showing a partial region A12 of the first side plate 203a in which the side face adhesive layer 205a as shown in FIG. 14A is formed.

As shown in FIG. 14A and FIG. 14B, by applying an adhesive (second adhesive) in liquid form or laminating an adhesive (second adhesive) in dry film form to the first side plate 203a, a side face adhesive layer 205a (first side face adhesive layer) with a film thickness D1 is formed.

<Step b2: First Filling Adhesive Application Step>

Figure 15A:
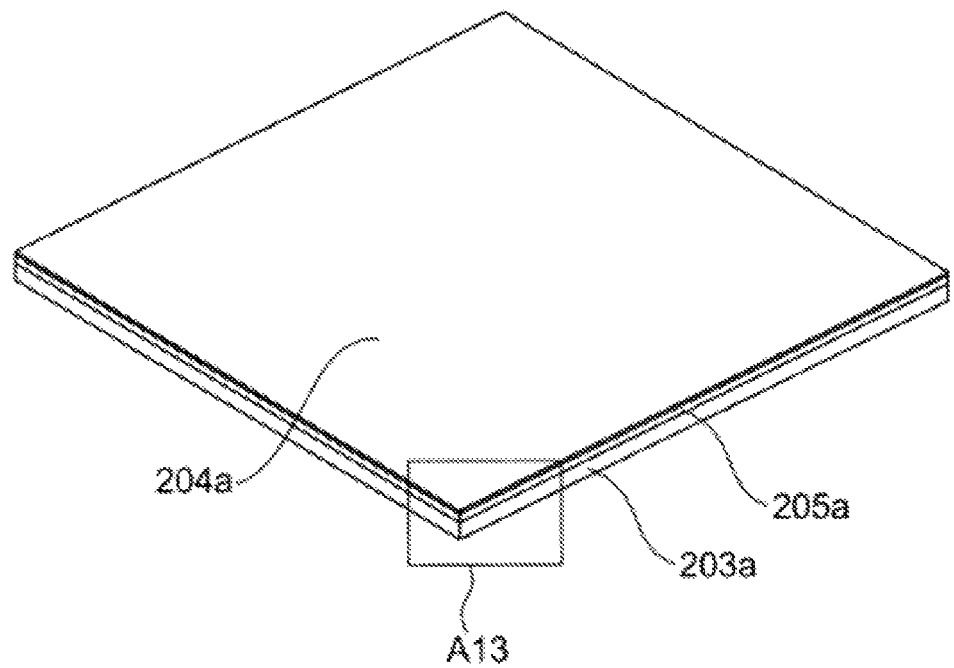
FIG. 15A shows a first filling adhesive application step in the production method of the rod lens array unit according to Embodiment 2.
Figure 15B:
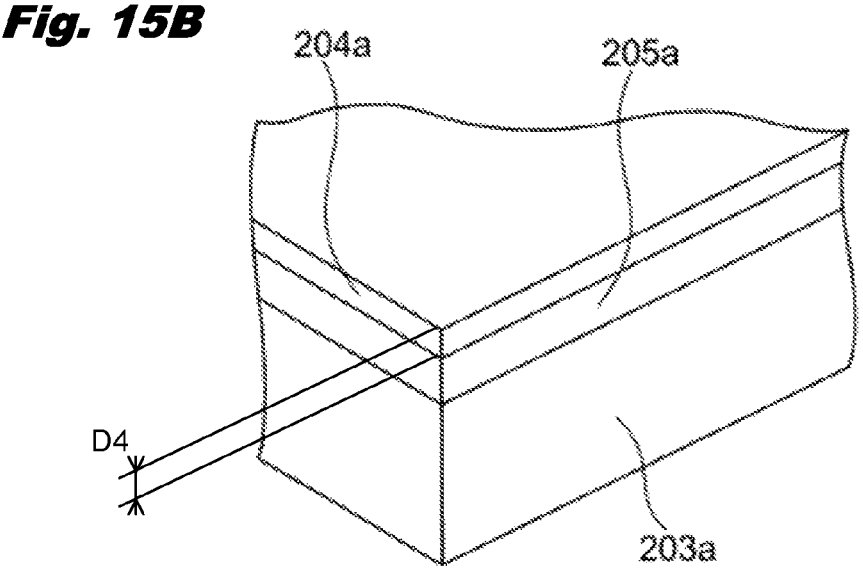
FIG. 15B is an enlarged perspective view showing a partial region of a first filling adhesive layer formed on a first side plate and the side face adhesive layer shown in FIG. 15A.

FIG. 15A shows a first filling adhesive application step in the production method of the rod lens array unit 201 according to Embodiment 2, and FIG. 15B is an enlarged perspective view showing a partial region A13 of the first filling adhesive layer 204a formed on the first side plate 203a and the side face adhesive layer 205a shown in FIG. 15A.

A first filling adhesive as a first adhesive is applied on the side face adhesive layer 205a on the first side plate 203a obtained in step a2 to form a first filling adhesive layer 204a. It is desired that the first filling adhesive be in liquid form. It is desired that the film thickness D4 of the first filling adhesive layer 204a is at a degree of a film thickness causing no gap between the rod lens array 202b and the side face adhesive layer 205a in a later step (step d2: rod lens bonding step).

<Step c2: Rod Lens Arrangement Step>

Figure 16A:
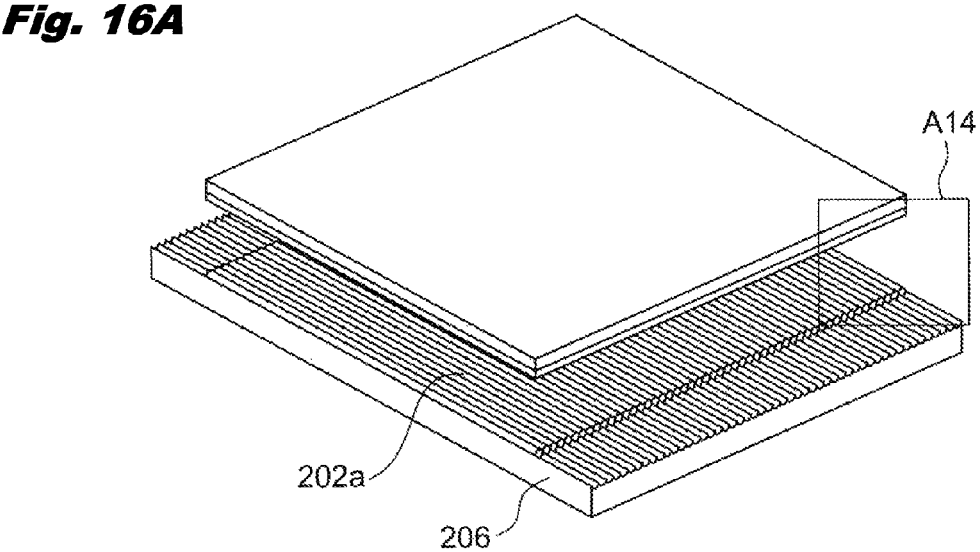
FIG. 16A shows a rod lens arrangement step of the production method of the rod lens array unit according to Embodiment 2.
Figure 16B:
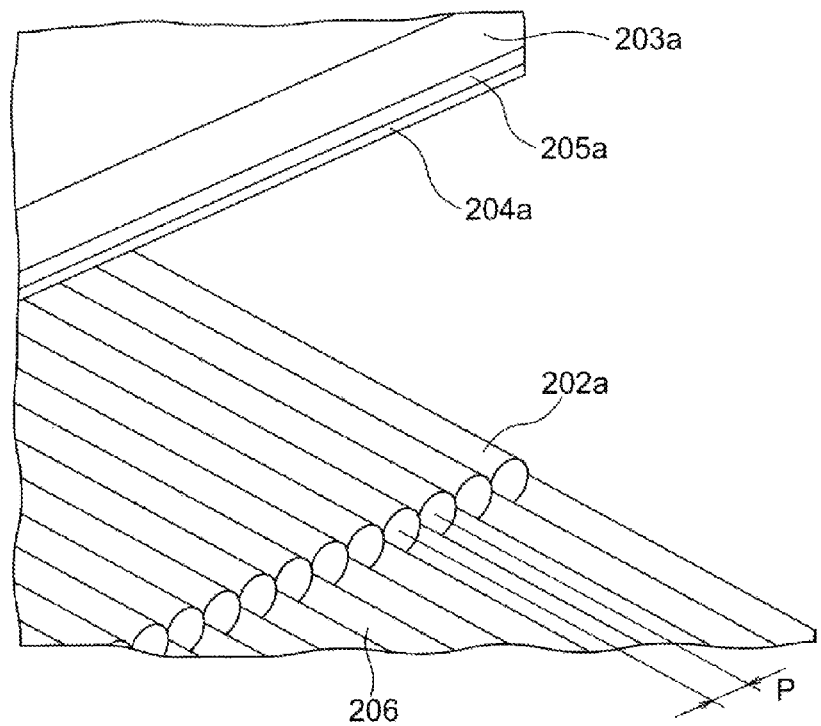
FIG. 16B is an enlarged perspective view showing a partial region of the plurality of rod lenses arranged on the array board shown in FIG. 16A.

FIG. 16A shows a rod lens arrangement step of the production method of the rod lens array unit 201 according to Embodiment 2, and FIG. 16B is an enlarged perspective view showing a partial region A14 of the plurality of rod lenses 202a arranged on the array board 206 shown in FIG. 16A.

As shown in FIG. 16A and FIG. 16B, a plurality of rod lenses 202a are arranged on the array board 206 in which a plurality of grooves (grooves) are formed in a manner such that the array pitches P of the plurality of rod lenses 202a are constant. The grooves of the array board 206 can be made by, for example, cutting or etching the board in which the main material is aluminum or glass, in consideration of the shapes and the dimensions of the rod lenses 202a.

<Step d2: Rod Lens Adherence Step>

Figure 17A:
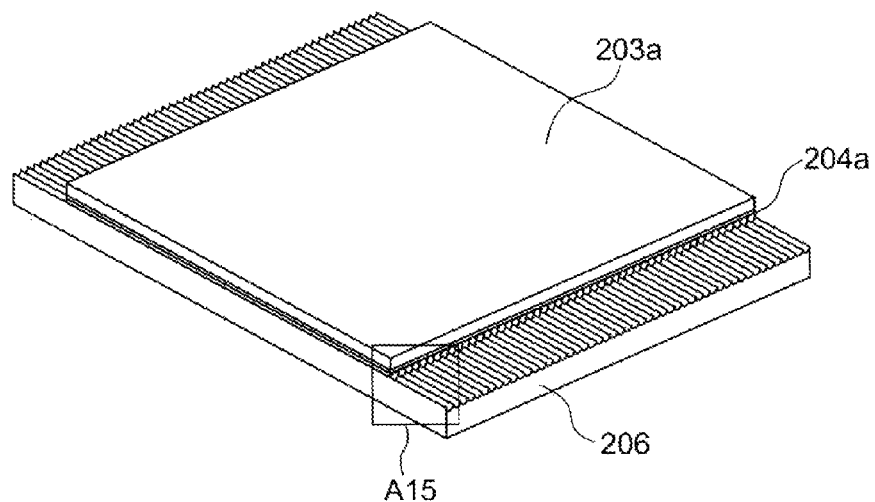
FIG. 17A shows a rod lens bonding step in the production method of the rod lens array unit according to Embodiment 2.
Figure 17B:
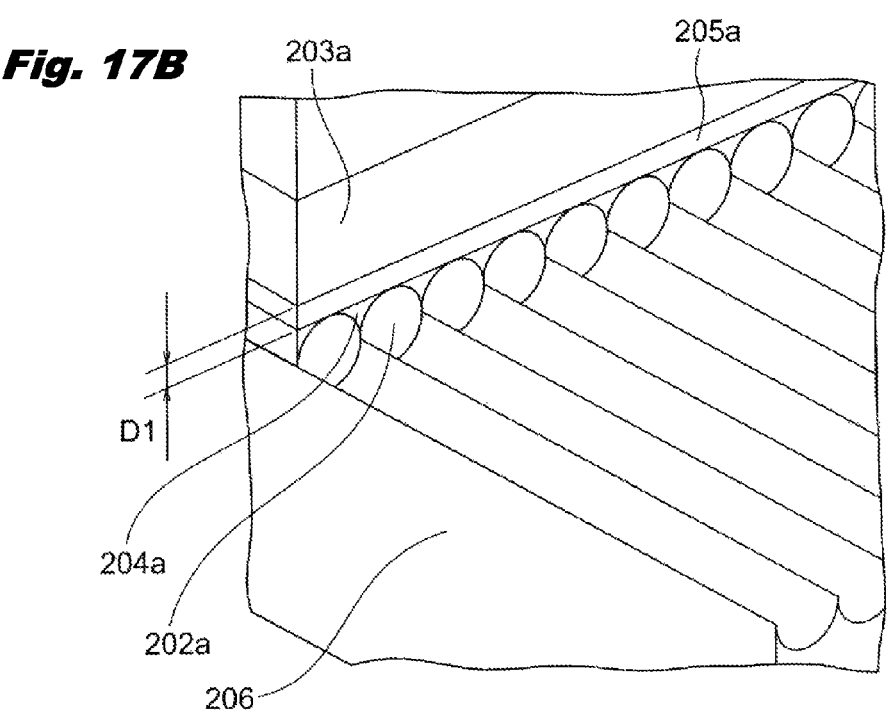
FIG. 17B is an enlarged perspective view showing a partial region of a plurality of rod lenses adhered to a first filling adhesive layer shown in FIG. 17A.

FIG. 17A shows a rod lens bonding step in the production method of the rod lens array unit 201 according to Embodiment 2, and FIG. 17B is an enlarged perspective view showing a partial region A15 of a part of the plurality of rod lenses 202a adhered to the first filling adhesive layer 204a shown in FIG. 17A.

A surface of the first side plate 203a in which the first filling adhesive layer 204a is formed is put in close contact with the plurality of rod lenses 202a arranged on the array board 206 (the rod lens array 202b) to fill the first filling adhesive in the gap around the rod lens array 202b to perform press-bonding so that the side face adhesive layer 205a comes in direct contact with the side face of the rod lens array 202b (the first side face).

When press-bonding, it is preferable that a load control and positioning be performed for the press-bonding so that the first distance D1 formed between the rod lens array 202b and the first side plate 203a by the side face adhesive layer 205a as a spacer is secured.

When the viscosity of the first filling adhesive layer 204a is a low viscosity such as, for example, 10 [Pa·s] or lower, in this step d2, the first filling adhesive layer 204a may be preheated to increase the viscosity of the first filling adhesive layer 204a or to harden the first filling adhesive layer 204a. By increasing the viscosity of the first filling adhesive layer 204a or by hardening the first filling adhesive layer 204a, the variations in the array pitch P in the later steps can be suppressed.

<Step e2: Rod Lens Transfer Step>

Figure 18A:
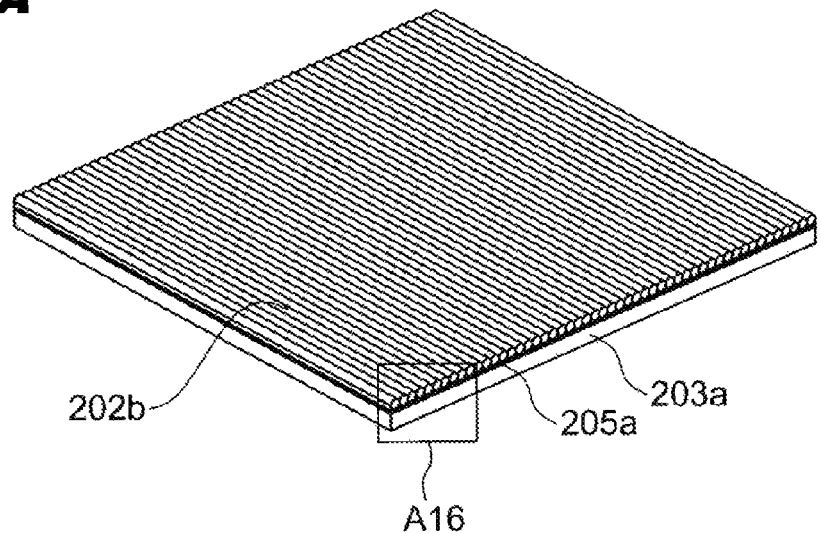
FIG. 18A shows a rod lens transfer step in the production method of the rod lens array unit according to Embodiment 2.
Figure 18B:
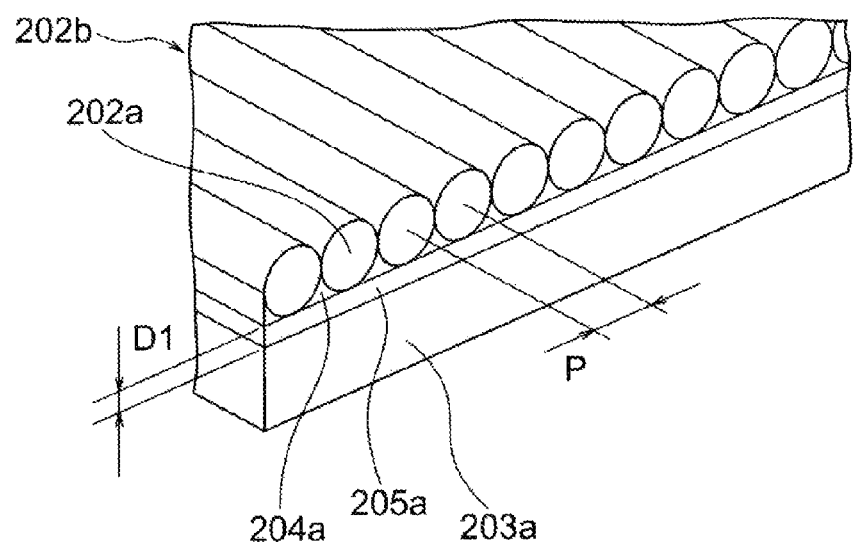
FIG. 18B is an enlarged perspective view showing a partial region of the rod lenses fixed to a first side plate and a side face adhesive layer shown in FIG. 8A.

FIG. 18A shows a rod lens transfer step in the production method of the rod lens array unit 201 according to Embodiment 2, and FIG. 18B is an enlarged perspective view showing a partial region A16 of the rod lens array 202b fixed to the first side plate 203a and the first side face adhesive layer 205a shown in FIG. 18A.

By pulling up the first side plate 203a in which the rod lens array 202b is fixed from the array board 206, the rod lens array 202b is moved (transferred) onto the side face adhesive layer 205a from the array board 206. To suppress the variations in the array pitch P in later steps, the first filling adhesive layer 204a or the side face adhesive layer 205a may be preheated in this step e2.

<Step f2: Second Filling Adhesive Application Step>

Figure 19A:
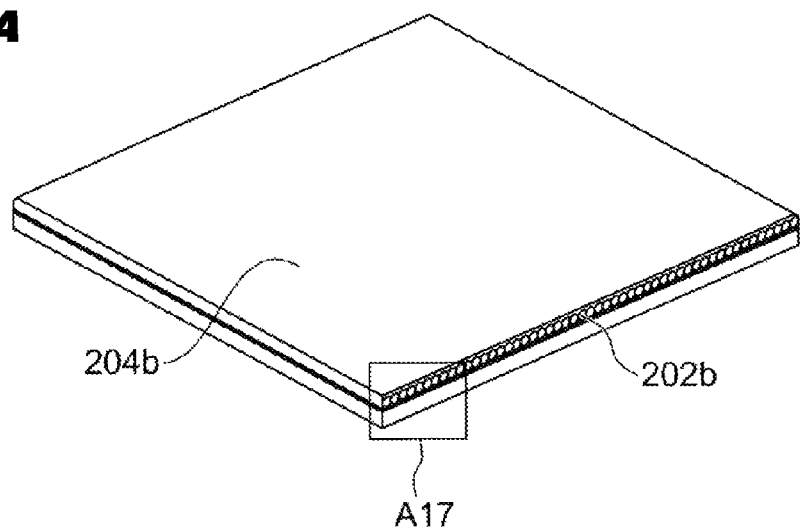
FIG. 19A shows a second filling adhesive application step in the production method of the rod lens array unit according to Embodiment 2.
Figure 19B:
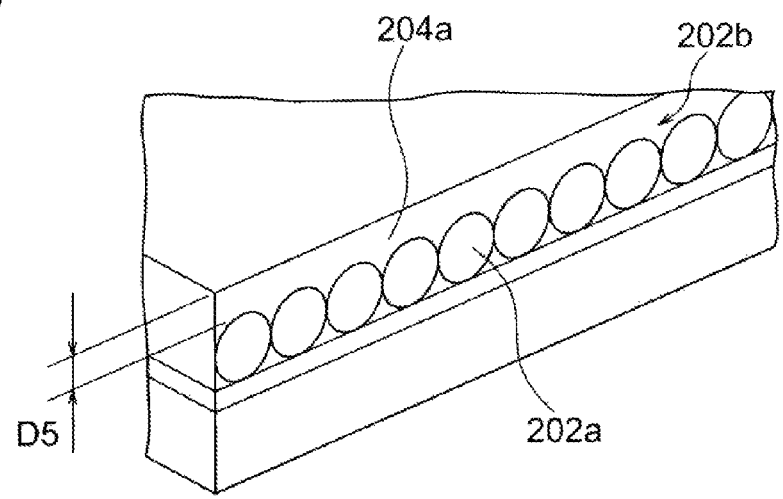
FIG. 19B is an enlarged perspective view showing a partial region of a second filling adhesive layer formed on the rod lens array shown in FIG. 19A.

FIG. 19A shows a second filling adhesive application step in the production method of the rod lens array unit 201 according to Embodiment 2, and FIG. 19B is an enlarged perspective view showing a partial region A17 of the second filling adhesive layer 204b formed on the rod lens array 202b shown in FIG. 19A.

A second filling adhesive as a first adhesive is applied to the side face (second side face) of the rod lens array 202b obtained in step e2 to form a second filling adhesive layer 204b. It is preferable that the second filling adhesive be in liquid form. It is preferable that the film thickness D5 of the second filling adhesive layer 204b be set to be a degree of a film thickness causing no gap between the rod lens array 202b and the side face adhesive layer 205b in a later step (step h2: second side plate bonding step) when the second side plate 203b and the rod lens array 202b are fixed.

<Step g2: Second Side Face Adhesive Layer Forming Step>

Figure 20A:
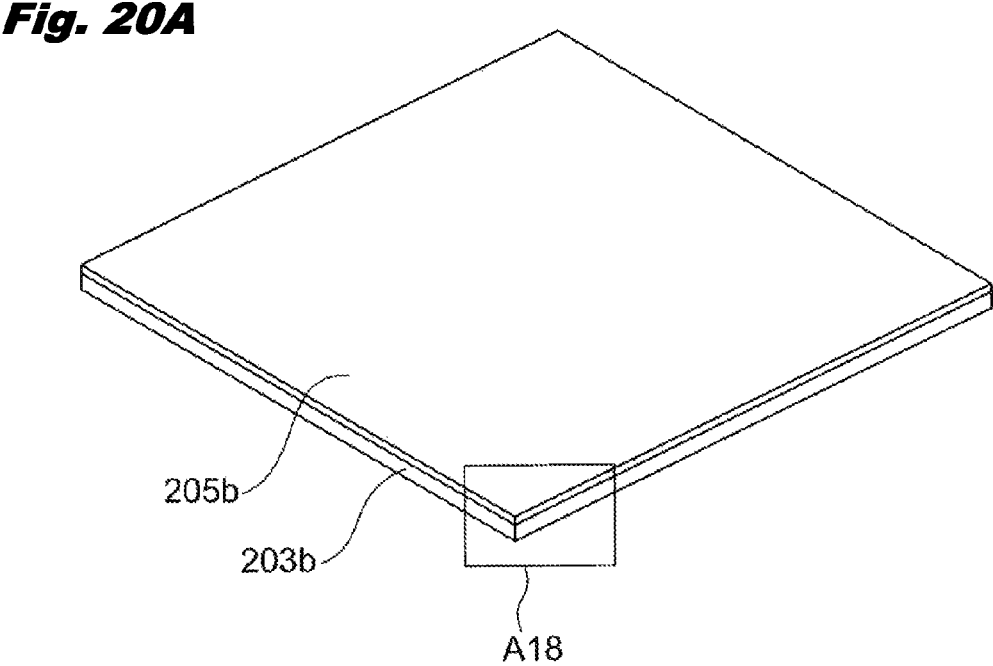
FIG. 20A shows a second side face adhesive layer forming step in the production method of the rod lens array unit according to Embodiment 2.
Figure 20B:
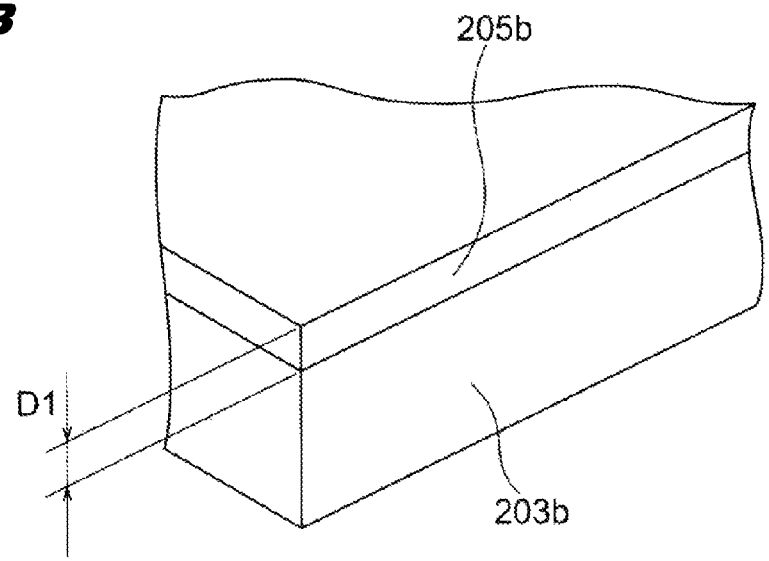
FIG. 20B is an enlarged perspective view showing a partial region of the second side plate in which a side face adhesive layer as shown in FIG. 20A is formed.

FIG. 20A shows a second side face adhesive layer forming step in the production method of the rod lens array unit 201 according to Embodiment 2, and FIG. 20B is an enlarged perspective view showing a partial region A18 of the second side plate 203b in which the side face adhesive layer 205b as shown in FIG. 20A is formed.

As shown in FIG. 20A and FIG. 20B, by applying an adhesive (second adhesive) in liquid form or laminating an adhesive (second adhesive) in dry film form on the second side plate 203b, a side face adhesive layer 205b (second side face adhesive layer) with a film thickness D1 is formed.

<Step f2: Second Side Plate Bonding Step Step>

Figure 21A:
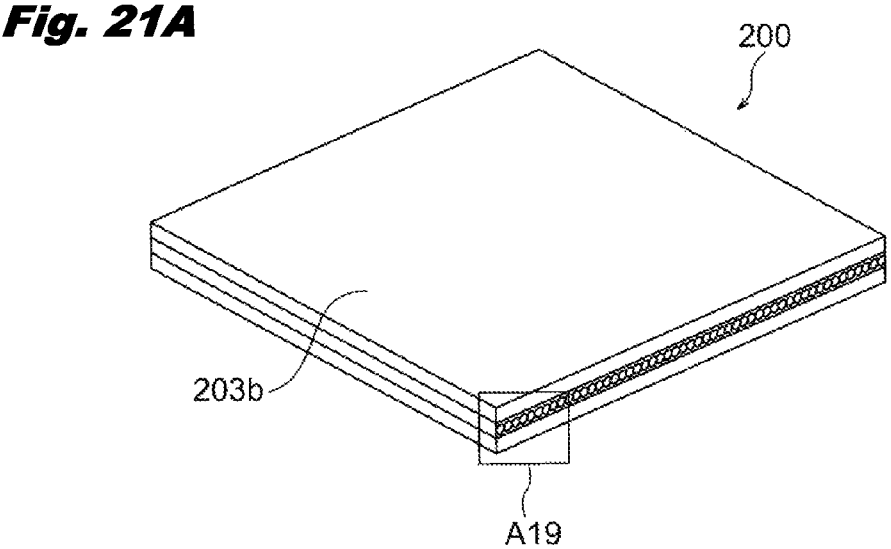
FIG. 21A shows a second side plate adhering step in the production method of the rod lens array unit according to Embodiment 2.
Figure 21B:
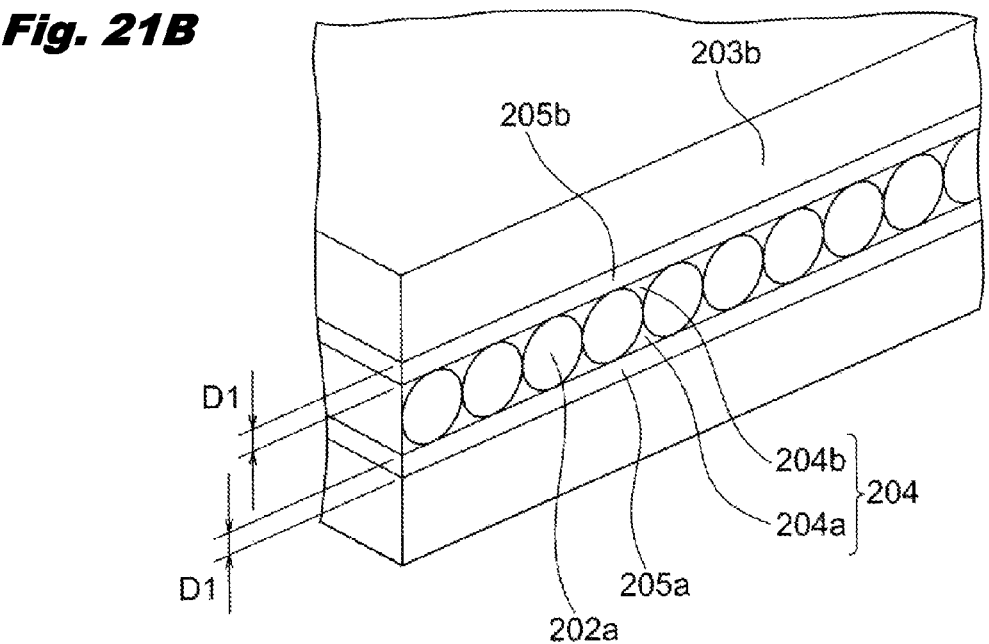
FIG. 21B is an enlarged perspective view showing a partial region of the rod lens array sheet shown in FIG. 21A.

FIG. 21A shows a second side plate bonding step in the production method of the rod lens array unit 201 according to Embodiment 2, and FIG. 21B is an enlarged perspective view showing a partial region A19 of the rod lens array sheet 200 shown in FIG. 21A.

In Step h2, the second filling adhesive layer 204b and the side face adhesive layer 205b on the second side plate 203b are adhered to produce the rod lens array sheet 200. Specifically, the second filling adhesive layer 204b obtained in step f2 and a surface of the second side plate 203b in which the side face adhesive layer 205b is provided are arranged so as to face each other, and the second side plate 203b is pressed (press-bonded) so that the side face adhesive layer 205b comes in direct contact with the rod lens array 202b. With the press-bonding, the first filling adhesive and the second filling adhesive are filled around the rod lens array 202b, and the rod lens array 202b in which the first filling adhesive and the second adhesive are filled is sandwiched and fixed to the surfaces of the first side plate 203a and the second side plate 203b in which the second adhesive is applied.

When press-bonding, it is desired that a load control and positioning be performed for the press-bonding so that the first distance D1, which is formed by the side face adhesive layer 205b as a spacer between the rod lens array 202b and the second side plate 203b, is secured. After completing the step h2, the stacked structure (rod lens array sheet 200) obtained in step h2 is subjected to either or both of a heat treatment and a humidifying treatment to perform curing and bonding.

Further, the rod lens array unit 201 may be produced by executing similar processing as the processing in <step g1: slit forming step>, <step h1: cutting step>, and <step i1: machining step> explained in Embodiment 1.

In the slit forming step of Embodiment 1, the depth D2 of the slit of the rod lens array unit 101 is set to a depth in which the bottom part of the slit 107 is positioned within the range of the first filling adhesive layer 104a and the second filling adhesive layer 104b. However, in the slit forming step of Embodiment 2, the depth of the slit formed in the rod lens array unit 201 is set as a depth in which the bottom part of the slit is positioned within the range of the side face adhesive layer (that is, the side face adhesive layer 205a or 205b).

The rod lens array unit 201 is completed by the aforementioned steps. In the production method of the rod lens array unit 201 explained above, an example was explained, in which a plurality of rod lenses 202a are arranged in one array in the main scanning direction (direction that is orthogonal to the optical axes of the plurality of rod lenses 202a) in one rod lens array unit 201. However, the number of the arrays of the plurality of rod lenses 202a is not limited to one array.

For example, when stacking two arrays of the rod lens arrays 202b in the main scanning direction, based on the method explained in step a2 to step e2, a plurality of rod lenses 202a arranged as a first array is arranged on the side face adhesive layer 205, and similarly, a plurality of rod lenses 202a arranged as a second array is arranged on the side face adhesive layer 205b. The rod lens array 202b on the side face adhesive layer 205a and the rod lens array 202b on the side face adhesive layer 205b are arranged so as to face each other so that the first plurality of rod lenses 202a and the second plurality of rod lenses 202a are arranged in a manner as to be displaced by P/2 in the main scanning direction, and the filling adhesive may be filled between each of the rod lens arrays 202b to stack the two rod lens arrays 202b.

According to the production method of the rod lens array unit 201 relating to Embodiment 2, by securing the first distance D1 between the rod lens array 202b, and the first side plate 203a and the second side plate 203b, damages to the side face of the rod lens array 202b can be suppressed when processing the slit on the first side plate 103a and the second side plate 203.

Even when using the first side plate 203a and the second side plate 203b including materials small in linear expansion coefficient for temperature and humidity or materials low in machinability for the rod lens array unit 201, since the slit processing is performed so that both end faces of the first side plate 203a and the second side plate 203b of the rod lens array unit 201 in the optical axis direction are positioned inside both end faces of the rod lens array 202b in the optical axis direction, when performing mirror finishing on both end faces of the rod lens array 202b in the optical axis direction, damages to the cutting blade of the cutting device (for example, linear cutter) can be suppressed.

Since the side face adhesive layer 205a is formed between the first filling adhesive layer 204a and the first side plate 203a using an adhesive higher in viscosity (viscosity) than the adhesive forming the first filling adhesive layer 204a, when fixing the rod lens array 202b and the first side plate 203a, the variations of the first filling adhesive layer 204 and the side face adhesive layer 205a on the first side plate 203a can be reduced, and the arrangement of the rod lens array 202b can be stably performed.

The diameter Φ of the rod lens varies according to the size of apparatus. In a case of the embodiments shown in the application, the preferred range of the diameter Φ is from 0.3 mm to 1.0 mm (inclusive). Additionally, the first distance D1 is preferred to be from 0.1 mm to 1.0 mm, thereby the ratio of D1/Φ being preferably ranged from 0.1 to 3.3 (inclusive). The second distance D3 is preferred to be from 0.05 mm to 1.0 mm, thereby the ratio of D3/Φ being preferably ranged from 0.05 to 3.3 (inclusive). Here, the first distance D1 may be defined as a gap between the side face of the rod lens array and the side plate part in the thick direction. Simply, it may be calculated by a formula of (D9−Φ)/2. The D9 means a thickness of the filling adhesive layer 104 in the thick direction (Z). See FIG. 8B. The second distance D3 may be defined as a protrusion distance from the second principal surface 104c in the optical axis direction.

Embodiment 3

<Structure of LED Print Head 600>

Figure 22:
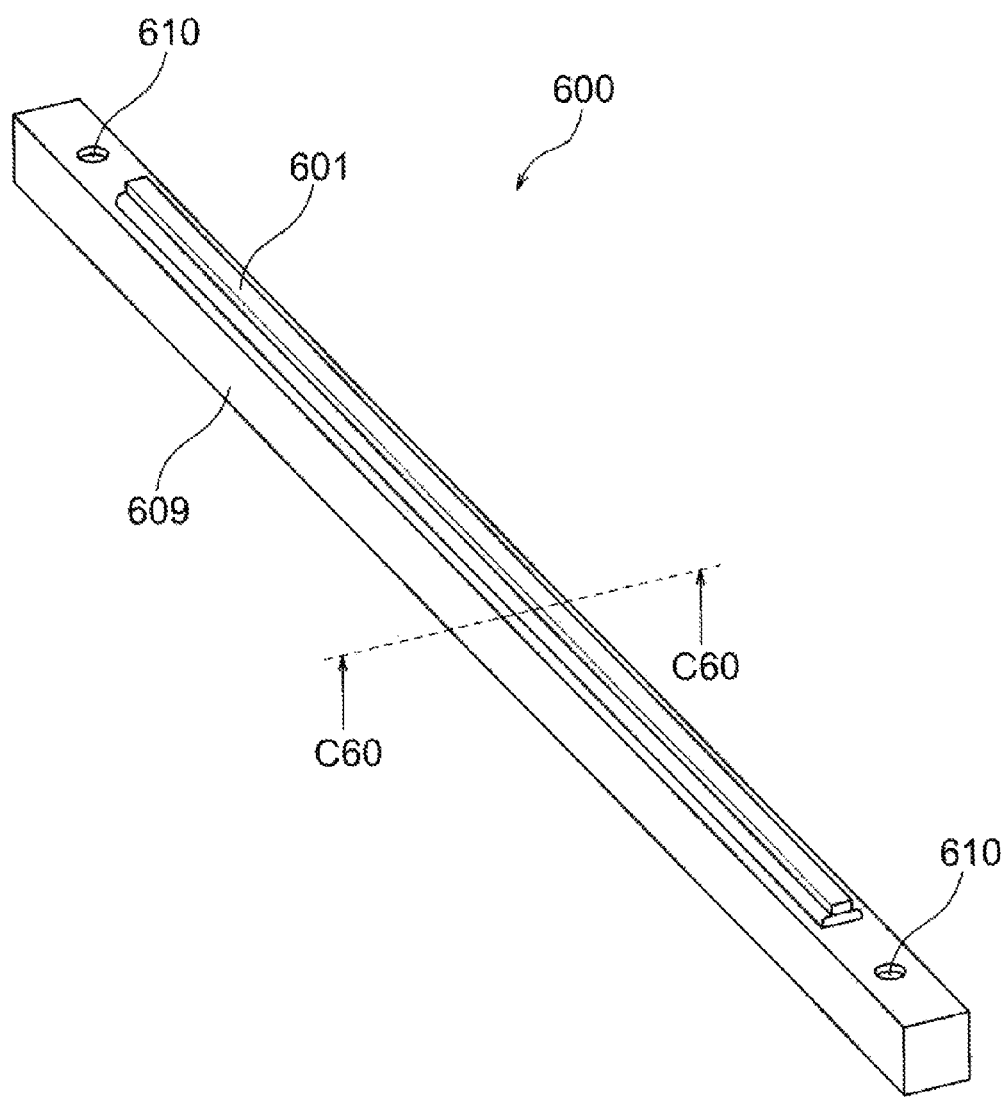
FIG. 22 is a perspective view showing an LED print head according to Embodiment 3 of the present invention.
Figure 23:
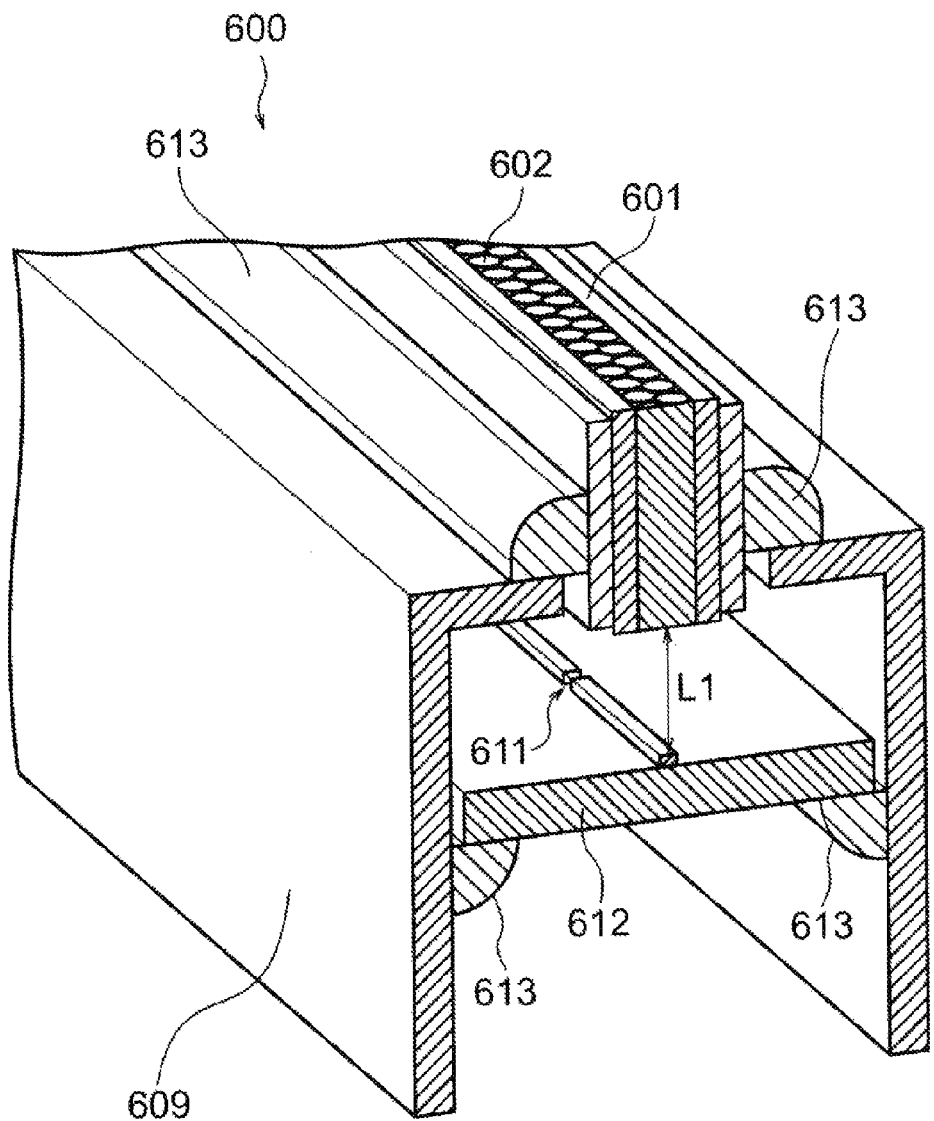
FIG. 23 is an enlarged perspective view showing the structure of the LED print head including the cross-sectional configuration of the LED print head shown in FIG. 22.

FIG. 22 is a perspective view showing an LED print head 600 according to Embodiment 3 of the present invention. FIG. 23 is an enlarged perspective view showing the structure of the LED print head 600 including the cross-sectional configuration of the LED print head 600 shown in FIG. 22 taken along a line segment C60-C-60. The LED print head 600 is used as, for example, an exposure device for exposing a surface of a photosensitive drum in an image forming apparatus such as a printer.

The LED print head 600 includes a plurality of semiconductor light emitting element arrays 611, a COB (Chip On Board) 612 as a board (print wiring board) in which a plurality of semiconductor light emitting element arrays 611 is arranged linearly by die bonding, a rod lens array unit 601, and a folder 609 for holding the rod lens array unit 601 and the COB 612. The plurality of semiconductor light emitting element arrays 611 on the COB 612 is not limited to the linearly arranged configuration, and may be arranged in a zigzag manner on the COB 612.

For the rod lens array unit 601, any one of the rod lens array units 101, 201, 301, 401, and 501 explained in Embodiments 1 to 5 may be utilized. Therefore, the rod lens array units 601 and the rod lens arrays 602 as shown in FIG. 22 and FIG. 23, depending on any one of the rod lens array units 101, 201, 301, 401, and 501 utilized for the rod lens array unit 601, corresponds to any of the rod lens arrays 102b, 202b, 302b, 402b, and 502b.

The semiconductor light emitting element array 611 is a chip in which a plurality of semiconductor light emitting elements such as LEDs (light emitting diodes) are arranged, and is, for example, a LED array chip. The rod lens array unit 601 and the COB 612 are adhered to the folder 609 using, for example, an ultraviolet curing type adhesive.

The rod lens array unit 601 and the COB 612 are fixed to the folders 609 so that the light emitting surfaces of the plurality of semiconductor light emitting element arrays 611 are positioned at a position (focal position) which is distant only by the focal length of the rod lens array 602 including the plurality of rod lenses provided in the rod lens array unit 601. That is, the rod lens array unit 601 and the COB 612 are fixed to the folder 609 at a position in which the distance L1 between the surface of the rod lens array 602 in the optical axis direction and the light emitting surfaces of the plurality of the semiconductor light emitting element arrays 611 is equal to the focal length of the rod lens array 602. It is preferable that the rod lens array unit 601 be adhered to the folder 609 so that, when the LED print head 600 is assembled into an image forming apparatus such as a printer, the distance between the surface of the rod lens array 602 in the optical axis direction and a photosensitive drum surface is equal to the focal length of the rod lens array 602.

A hole 610 as a positioning part is formed at a predetermined position near both ends of the top face of the folder 609 in the longitudinal direction. The hole 610 can be used for, for example, the positioning to determine the relative position of the LED print head 600 with respect to a printer main body configuration when mounting the LED print head 600 in an image forming apparatus such as a printer.

The sealing material 613 is arranged in the gap between the rod lens array unit 601 and the folder 609, and the gap between the COB 612 and the folder 609 to prevent contaminants such as toners from entering into the folder 609. As the sealing material 613, for example, silicone is used.

In the LED print head 600, the light emitted by the semiconductor light emitting element array 611 is collected by the rod lens array unit 601 to expose the irradiation target surface (for example, photosensitive drum surface). For example, when the LED print head 600 is mounted in an image forming apparatus such as a printer, the LED print head 600 irradiates light corresponding to the image data input in the image forming apparatus and forms the electrostatic latent image on the surface of the photosensitive drum.

According to the LED print head 600 of Embodiment 3, since any one of the rod lens array units 101, 201, 301, 401, and 501 explained in Embodiments 1 to 5 may be utilized for the rod lens array unit 601, a stable irradiation performance can be realized.

By using a material small in machinability or a material small in linear expansion coefficient for temperature and humidity for the side plate of the rod lens array unit 601, the variations in the relative positional relationship of the rod lens array unit 601 and the semiconductor light emitting element array 611 can be suppressed regardless of the changes in the operating environment such as a change in temperature or a change in humidity, or a change in temperature from self-heating from the COB 612.

Furthermore, even when the sealing material 613 deforms due to the temperature change, etc., in the surrounding environment, the adherence of the sealing materials 613 to the end face of the rod lens array 602 can be reduced since steps as step parts are formed on both sides of the rod lens array units 601 in the shorter direction.

Embodiment 4

<Structure of Contact Image Sensor Head 700>

Figure 24:
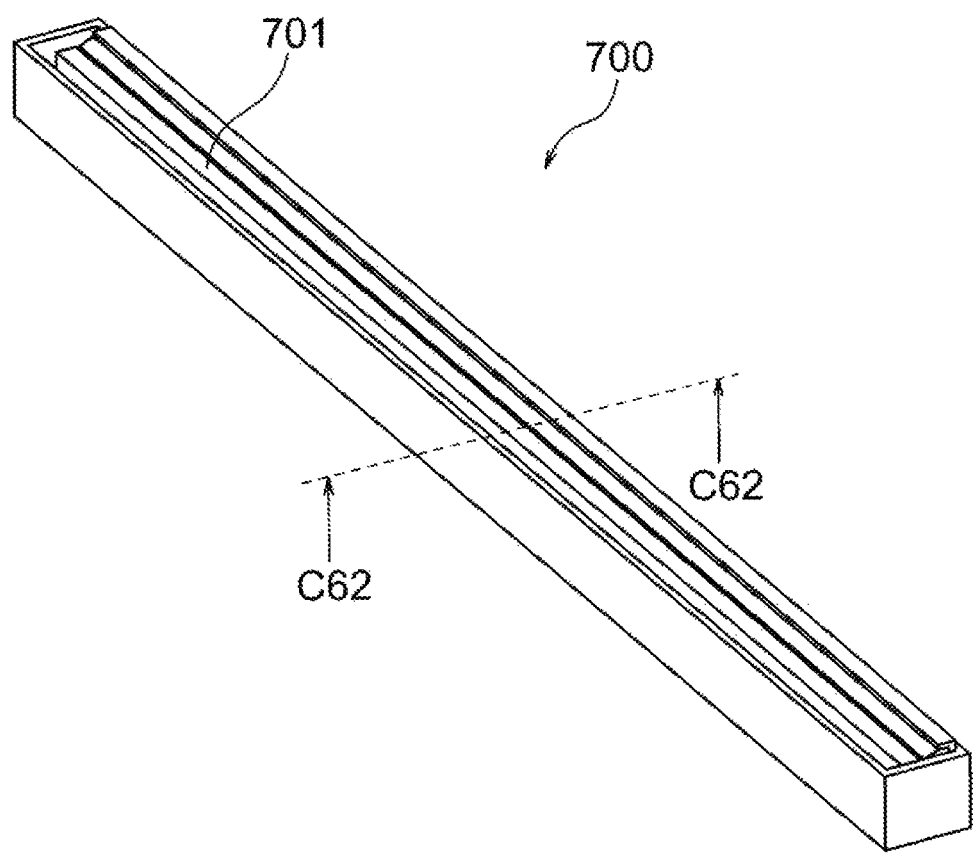
FIG. 24 is a perspective view showing a contact image sensor head according to Embodiment 4 of the present invention.
Figure 25:
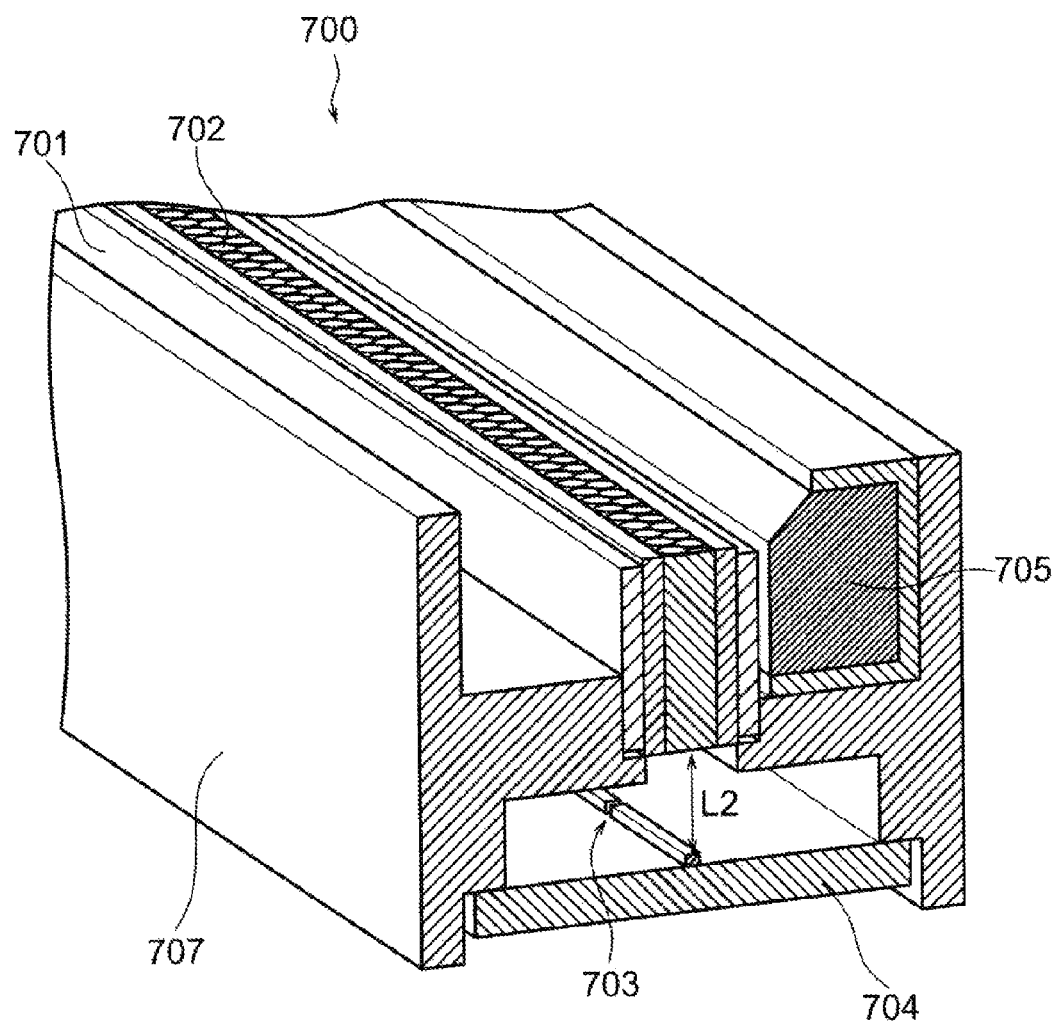
FIG. 25 is an enlarged perspective view showing a structure of the contact image sensor head including the cross-sectional configuration of the contact image sensor head shown in FIG. 24.

FIG. 24 is a perspective view showing a contact image sensor head 700 as an image sensor head of Embodiment 4 of the present invention. FIG. 25 is an enlarged perspective view showing the structure of the contact image sensor head 700 including the cross-sectional configuration of the contact image sensor head 700 shown in FIG. 24 taken along the line segment C62-C-62. The contact image sensor head 700 as an image sensor head, for example, can be used as a reader for receiving reflected light from mediums when light is irradiated by a medium in an image reader such as an image scanner.

The contact image sensor head 700 includes a plurality of semiconductor light receiving element arrays 703, a COB (Chip On Board) 704 as a board (print wiring board) in which a plurality of semiconductor light receiving element arrays 703 are arranged linearly by die bonding, a light guiding body 705 in which light sources are arranged inside, a rod lens array unit 701, and a folder 707 for holding the rod lens array unit 701 and the COB 704.

For the rod lens array unit 701, any one of the rod lens array units 101, 201, 301, 401, and 501 explained in Embodiments 1 to 3 may be utilized. Therefore, the rod lens arrays 702 of the rod lens array units 701 shown in FIG. 24 and FIG. 25 correspond to any of the rod lens arrays 102b and 202b depending on any one of the rod lens array units 101 and 201 applied to the rod lens array unit 701, The semiconductor light receiving element array 703 is a chip in which a plurality of light receiving elements for sensing reflected light from mediums such as manuscripts and converting it into electric signals is arranged. The rod lens array unit 701 and the COB 704 are, for example, adhered to the folder 707 using an ultraviolet curing type adhesive. The rod lens array unit 601 and the COB 704 are fixed to the folders 707 so that the light receiving surfaces of the plurality of semiconductor light receiving element arrays 703 are positioned at a position (focal position) which is distant only by the focal length of the rod lens array 702 including the plurality of rod lenses provided in the rod lens array unit 701. That is, the rod lens array unit 701 and the COB 704 are fixed to the folder 707 at a position in which the distance L2 between the surface of the rod lens array 702 in the optical axis direction and the light emitting surfaces of the plurality of the semiconductor light receiving element arrays 703 is equal to the focal length of the rod lens array 702. Further, it is preferable that the rod lens array unit 701 be adhered to the folder 707 so that, when the contact image sensor head 700 is assembled into an image reader such as a scanner, the distance between the surface of the rod lens array 702 in the optical axis direction and a manuscript provided on a platen is equal to the focal length of the rod lens array 702.

Further, the example of the contact image sensor head 700 is not limited to the example shown in FIG. 24 and FIG. 25. For example, a sealing material for preventing contaminants such as dust from entering into the folder 707 may be arranged in the gap between the rod lens array unit 701 and the folder 707, and the gap between the COB 704 and the folder 707. As the sealing material, silicone is used, for example.

The contact image sensor head 700, when it is assembled into an image reader such as a scanner, reads a manuscript when a light source arranged inside the light guiding body 705 emits light. The rod lens array unit 701 collects the reflected light from the manuscript, and the semiconductor light receiving element array 703 receives the light.

According to the contact image sensor head 700 of Embodiment 4, since any one of the rod lens array units 101 and 201 explained in Embodiments 1 and 2 is applied to the rod lens array unit 701, a stable light receiving performance can be realized.

Further, by using materials small in machinability or materials small in linear expansion coefficient for temperature and humidity for the side plate of the rod lens array unit 701, the variations in the relative positional relationship of the rod lens array unit 701 and the semiconductor light receiving element array 703 can be suppressed regardless of the changes in operating environment such as a change in temperature or a change in humidity, or a change in temperature from self-heating from the COB 704.

Further, since a step is formed as a step part on both sides of the rod lens array unit 701 in the shorter direction, the rod lens array unit 701 can be stably fixed to the folder 707.

Embodiment 5

<Structure of LED Printer 800>

Figure 26:
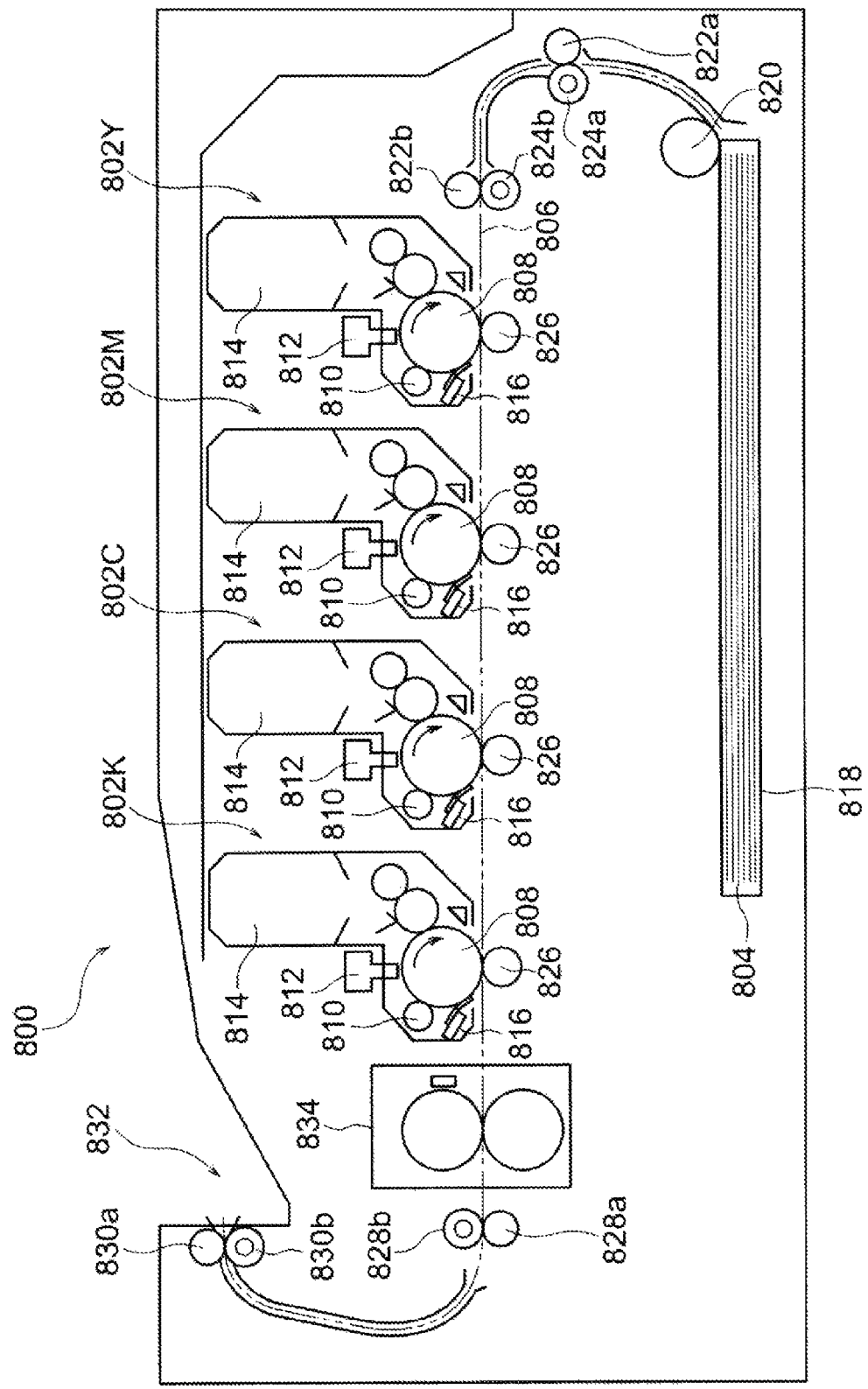
FIG. 26 is a cross-sectional view showing a structure of an LED printer as an image forming apparatus according to Embodiment 5 of the present invention.

FIG. 26 is a cross-sectional view showing a structure of an LED printer 800 as an image forming apparatus according to Embodiment 5 of the present invention. The LED printer 800 is a printer in which the LED print head 600 explained in Embodiment 3 is applied to an exposure device.

The LED printer 800 as an image forming apparatus forms a black and white image or a color image with an electrographic system using yellow (Y), magenta (M), cyan (C), and black (K) developers. The LED printer 800 is provided with four process units 802Y, 802M, 802C, and 802K corresponding to each of the colors, yellow (Y), magenta (M), cyan (C), and black (K). Each of the process units 802Y, 802M, 802C, and 802K are arranged in parallel along the carrying path 806 of a recording medium 804 such as a sheet, etc.

Each of the process units 802Y, 802M, 802C, and 802K includes a photosensitive drum 80 as an image carrier, a charging device 810 for charging the surface of the photosensitive drum 808 and arranged around the photosensitive drum 808, and an exposure device 812 forming electrostatic latent images on the surface of the charged photosensitive drum 808 by irradiating light corresponding to the externally inputted image data. For the exposure device 812, the LED print head 600 explained in Embodiment 3 is utilized.

Each of the process units 802Y, 802M, 802C, and 802K is further provided with a developing device 814 for supplying toner as a developer to the surface of the photosensitive drum 808 on which the electrostatic latent images are formed, and a cleaning device 816 for removing the toners remaining on the surface of the photosensitive drum 808. Further, the photosensitive drum 808 rotates in the arrow direction by receiving a driving force from a drive mechanism constituted by a drive source, gears, etc.

Furthermore, the LED printer 800 includes a sheet cassette 818 for storing recording mediums 804 such as sheets, etc., and a hopping roller 820 for separating and carrying the recording mediums 804 one by one. On the downstream side of the hopping roller 820 in the carrying direction of the recording medium 804, pinch rollers 822a and 822b and registration rollers 824a and 824b for carrying the recording medium 804 toward the process units 802Y, 802M, 802C, and 802K by correcting the skew of the recording medium 804, are provided, sandwiching the recording medium 804 with the pinch rollers 822a and 822b. The hopping roller 820 and the registration rollers 824a and 824b rotate interlocking with the drive source such as a motor, gears, etc.

The LED printer 800 is further provided with a transfer roller 826 arranged so as to face each of the photosensitive drums 808 in each of the process units 802Y, 802M, 802C, and 802K. The transfer roller 826 is constituted by a semiconductive rubber, etc. The LED printer 800 is provided with a fuser device 834, ejection rollers 828a, 828b, 830a, and 830b, and a stacker 832.

In the LED printer 800, the electrical potential of the photosensitive drum 808 and the electrical potential of the transfer roller 826 are set so that the toner image formed on the photosensitive drum 808 is transferred to the recording medium 804.

The recording medium 804 loaded in the sheet cassette 818 is separated and carried one by one by the hopping roller 820. The recording medium 804 supplied from the sheet cassette 818 passes through the registration rollers 824a and 824b, and the pinch rollers 822a and 822b to sequentially pass between the photosensitive drum 808 and the transfer roller 826 in each of the process units 802Y, 802M, 802C, and 802K. The recording medium 804 passes between the photosensitive drum 808 and the transfer roller 826 in each of the process units 802Y, 802M, 802C, and 802K, and the toner images of each color are sequentially transferred to the recording medium 804, and then heat or pressure is applied by the fuser device 834 to fuse the toner images of each color on the recording medium 804. The recording medium 804 in which toner images are fused is ejected to the stacker 832 by the ejection rollers 828a, 828b, 830a, and 830b.

Further, the example of the LED printer 800 shown in FIG. 26 shows a configuration example in a case in which printing is performed only on one side of the recording medium 804, but a sheet reversing device to be used for reversing the recording medium 804 when printing on both faces of the recording medium 804 may also be provided.

According to the LED printer 800 of Embodiment 5, since the LED print head 600 explained in Embodiment 3 is used as the exposure device 812, stable print quality can be realized.

Embodiment 6

<Structure of Image Scanner 900>

Figure 27:
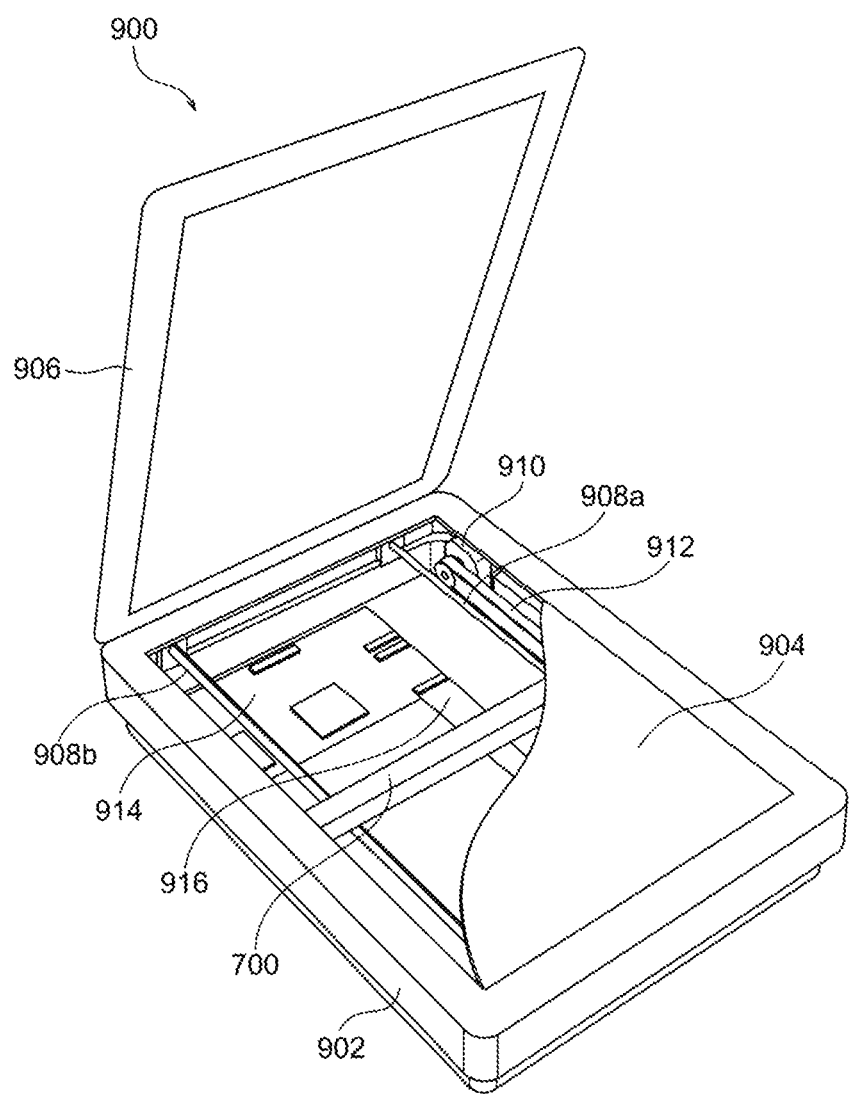
FIG. 27 is a perspective view showing an exterior of an image scanner as an image reader according to Embodiment 6 of the present invention.

FIG. 27 is a perspective view showing an exterior of an image scanner as an image reader according to Embodiment 6. The image scanner 900 is a contact image scanner that is a flat bed type to which the contact image sensor head 700 illustrated in Embodiment 4 is applied.

As shown in FIG. 27, the image scanner 900 as an image reader includes a housing 902, a platen 904 on which a manuscript is placed and a cover 906 (or platen cover) that presses the manuscript placed on the plater 904 downwardly from the upside. Inside the housing 902, the contact image sensor head 700, guides 908a and 908b, a stepping motor 910, a drive belt 912, a control circuit 914 and a flexible flat cable 916 are arranged.

The contact image sensor head 700 is supported such that the head is linearly movable along the pair of the guides 908a and 908b fixed to the housing 902. In order to allow the contact image sensor head 700 to slide along the guides 908a and 908b in the sub scanning direction (or not main direction), the contact image sensor head 700 is connected to the drive belt 912 connected to the stepping motor 910. The control circuit 914 for controlling the image sensor head 700 makes wire connections to the contact image sensor head 700 through the flexible flat cable 916.

With the image scanner 900 according to Embodiment 6, the contact image sensor head 700 illustrated in Embodiment 4 can be used, thereby realizing secure image reading quality.

What is claimed is:

1. A rod lens array unit, comprising:
at least a rod lens array that includes a plurality of rod lenses arranged in a line, each of the rod lenses having an optical axis extending in an optical axis direction, the rod lens array having a first surface at one end of the optical axis direction and another first surface at the other end of the optical axis direction;
a pair of side plate parts stacked so as to sandwich the rod lens array in a thick direction that is orthogonal to the optical axis direction, the side plate parts each having a second surface at the one end of the optical axis direction and another second surface at the other end of the optical axis direction, and
an adhesive part that is formed mainly of an adhesive and interposes between the rod lens array and one of the side plate parts with a predetermined thickness (D1) in the thick direction, another adhesive part having an adhesive end face at the one end of the optical direction, wherein
at the one end of the optical axis direction,
the first surface protrudes from the second surface in the optical axis direction,
composed with a protrusion face and a recess face that is recessed from the protrusion face by a protrusion distance (D3) in the optical axis direction, the protrusion face being positioned closer to the first surface than the recess face in the thick direction,
protrusion face of the adhesive end face is flush with the first surface in the thick direction, and
the recess face of the adhesive end face is flush with the second surface in the thick direction.

2. The rod lens array unit according to claim 1, wherein the adhesive part is disposed surrounding the rod lens array.

3. The rod lens array unit according to claim 1, wherein
a portion of the adhesive part, which is determined between the rod lens array and one of the side plate parts, is configured with two layers that are layered in the thick direction,
one layer of the adhesive part being defined as a first adhesive layer made of a first adhesive and surrounding the rod lens array, the other layer of the adhesive part being defined as a second adhesive layer made of a second adhesive of which characteristics are different from the first adhesive, and being provided between the first adhesive layer and the one of the side plate parts.

4. The rod lens array unit according to claim 3, wherein a viscosity of the second adhesive before hardening is higher than a viscosity of the first adhesive before hardening.

5. The rod lens array unit according to claim 4, wherein a viscosity of the second adhesive before hardening is 10 [Pa·s] or more.

6. The rod lens array unit according to claim 3, wherein the first adhesive layer has a curing shrinkage ratio of 3% or lower, and
the side plates are made of a material of which Vickers hardness is 100 HV or higher.

7. The rod lens array unit according to claim 1, wherein the adhesive part is configured with three layers that are layered in the thick direction of the rod lens array,
one layer of the adhesive part being defined as a first adhesive layer made of a first adhesive and surrounding the rod lens array,
the other two layers of the adhesive part being defined as second adhesive layers made of a second adhesive of which characteristics are different from the first adhesive, and being provided sandwiching the first adhesive layer in the thick direction.

8. The rod lens array unit according to claim 7, wherein a viscosity of the second adhesive before hardening is higher than a viscosity of the first adhesive before hardening.

9. An LED print head, comprising:
a plurality of semiconductor light emitting element arrays;
a board in which the semiconductor light emitting element arrays are arranged;
the rod lens array unit as recited in claim 1; and
a folder that holds the rod lens array unit and the board in a manner such that surfaces of the semiconductor light emitting element arrays are positioned at a focal position of the rod lens array provided in the rod lens array unit.

10. An image forming apparatus, comprising:
the LED print heads as recited in claim 9.

11. An image sensor head, comprising:
a plurality of semiconductor light receiving element arrays;
a board in which the semiconductor light receiving element arrays are arranged;
the rod lens array unit as recited in claim 1; and
a folder that holds the rod lens array unit and the board in a manner such that surfaces of the semiconductor light receiving element arrays are positioned at a focal position of the rod lens array provided in the rod lens array unit.

12. An image reader, comprising:
the image sensor head as recited in claim 11.

13. The rod lens array unit according to claim 1, wherein a ratio of D3/Φ is ranged from 0.05 to 3.3,
where
the D3 means the protrusion distance that is defined as a distance between the first face and the second face in the optical axis direction, and
the Φ means a diameter of the rod lens.

14. The rod lens array unit according to claim 13, wherein a ratio of D1/Φ is ranged from 0.1 to 3.3,
where
the D1 means the thickness of the adhesive part in the direction that is defined as a gap between the rod lens array and one of the side plate parts.

15. The rod lens array unit according to claim 1, wherein at the other end of the optical axis direction,
the another first surface protrudes from the another second surface in the optical axis direction,
the another adhesive end face is shaped in another bump such that the another adhesive end face is composed with another protrusion face and another recess face that is recessed from the another protrusion face by another predetermined distance in the optical axis direction, the another protrusion face being positioned closer to the another first surface than the another recess face in the thick direction,
the another protrusion face of the another adhesive end face is flush with the another first surface in the thick direction, and
the another recess face of the another adhesive end face is flush with the another second surface in the thick direction.

16. The rod lens array unit according to claim 15, wherein the adhesive part further interposed between the rod lens array and the other of the side plate parts in the thick direction such that another adhesive end face is formed such that two of these adhesive end faces are aligned at the other end, and
shapes of these adhesive end faces are line symmetry with respect to the optical axes of the rod lens array.

17. The rod lens array unit according to claim 1, wherein the adhesive part further interposed between the rod lens array and the other of the side plate parts in the thick direction such that another adhesive end face is formed such that two of these adhesive end faces are aligned at the one end, and
shapes of these adhesive end faces are line symmetry with respect to the optical axes of the rod lens array.

18. A method for producing a rod lens array unit, the method comprising:
respectively fixing a first side face and a second side face of a rod lens array including a plurality of rod lenses to a first side plate and a second side plate with adhesive such that the rod lens array is surrounded with an adhesive part made of the adhesive;
forming a first long notch that penetrates the first side plate and plunges into the adhesive part such that side plate cutting edges of the adhesive part are formed;
forming a second long notch that penetrates the second side plate and plunges into the adhesive part at a position corresponding to the first long notch such that other side plate cutting edges of the adhesive part are formed; and
cutting the rod lens array with a cutting width (D7) narrower than either a width (D6) of the first long notch or a width (D6) of the second long notch in the second long notch such that rod lens cutting edges of the adhesive part are formed, wherein
the rod lens cutting edges of the adhesive part protrude from these side plate cutting edges of the adhesive part in an optical axis direction in which optical axes of the rod lenses extend.

19. The method for producing a rod lens array unit according to claim 18, wherein:
the step of respectively fixing the first side face and the second side face of the rod lens array further includes:

applying first adhesive to the rod lens array so that the first side face and the second side face of the rod lens array are surrounded with the first adhesive, then applying second adhesive, which has different characteristics from the first adhesive, on both sides of the first adhesive, then sandwiching the second adhesive with the first side plate and the second side plate.

\* \* \* \* \*